(12) United States Patent
Yoshida et al.

(10) Patent No.: US 10,316,692 B2
(45) Date of Patent: Jun. 11, 2019

(54) VIBRATION SUPPRESSION METHOD AND VIBRATION SUPPRESSION APPARATUS FOR TURBOCHARGER CAPABLE OF BEING DRIVEN BY MOTOR

(71) Applicant: Mitsubishi Heavy Industries, Ltd., Tokyo (JP)

(72) Inventors: Tadashi Yoshida, Tokyo (JP); Musashi Sakamoto, Tokyo (JP); Ryoji Sasaki, Tokyo (JP); Yoshihisa Ono, Nagasaki (JP); Hidetaka Nishimura, Nagasaki (JP); Takeshi Tsuji, Houston, TX (US)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 15/385,645

(22) Filed: Dec. 20, 2016

(65) Prior Publication Data

US 2018/0171823 A1   Jun. 21, 2018

(51) Int. Cl.
  *F01D 25/04* (2006.01)
  *F04D 29/053* (2006.01)
  (Continued)

(52) U.S. Cl.
  CPC ............... *F01D 25/04* (2013.01); *F01D 5/04* (2013.01); *F01D 21/003* (2013.01); *F02B 33/40* (2013.01);
  (Continued)

(58) Field of Classification Search
  CPC .......... F01D 25/04; F01D 21/003; F01D 5/04; F04D 29/053; F04D 29/284; F02B 37/04;
  (Continued)

(56) References Cited

U.S. PATENT DOCUMENTS

2003/0223892 A1   12/2003   Woollenweber
2009/0081040 A1*  3/2009    Ueno ................ F16C 19/55
                                              415/229
(Continued)

FOREIGN PATENT DOCUMENTS

JP   H05098985 A    4/1993
JP   2007056790 A   3/2007
(Continued)

OTHER PUBLICATIONS

Shiraishi, et al, "Energy Savings through Electric-assist Turbocharger for Marine Diesel Engines," Mitsubishi Heavy Industries Technical Review, vol. 52, No. 1, Mar. 2015, 12 Pages.
(Continued)

*Primary Examiner* — Hoang M Nguyen
(74) *Attorney, Agent, or Firm* — Berkeley Law & Technology Group, LLP

(57) ABSTRACT

A method of suppressing shaft vibration of a turbocharger capable of being driven by a motor includes: a specific-vibration-state determination step of determining whether a rotor shaft of the turbocharger is in a specific vibration state in which a magnitude of shaft vibration of the rotor shaft is, or is likely to be, greater than a predetermined magnitude; an excited state determination step of determining whether the motor is in an excited state in which an exciting voltage is applied to the motor; and a vibration suppression execution step of applying the exciting voltage to the motor if it is determined that the rotor shaft is in the specific vibration state in the specific-vibration-state determination step and it is determined that the motor is not in the excited state in the excited state determination step.

16 Claims, 17 Drawing Sheets

(51) Int. Cl.
    *F02B 37/04*     (2006.01)
    *F02B 33/40*     (2006.01)
    *F01D 5/04*     (2006.01)
    *F01D 21/00*     (2006.01)
    *F02B 39/10*     (2006.01)
    *F04D 25/06*     (2006.01)
    *F04D 27/00*     (2006.01)
    *F04D 27/02*     (2006.01)
    *F04D 29/66*     (2006.01)

(52) U.S. Cl.
    CPC .............. *F02B 37/04* (2013.01); *F02B 39/10* (2013.01); *F04D 25/0606* (2013.01); *F04D 27/001* (2013.01); *F04D 27/0261* (2013.01); *F04D 29/668* (2013.01); *F05D 2220/40* (2013.01); *F05D 2260/96* (2013.01); *F05D 2270/334* (2013.01); *Y02T 10/144* (2013.01)

(58) Field of Classification Search
    CPC ... F02B 33/40; F05D 2240/60; F05D 2220/40
    USPC ............ 60/598, 600, 602, 605.1, 605.2, 611
    See application file for complete search history.

(56) References Cited

U.S. PATENT DOCUMENTS

2009/0238689 A1*   9/2009   Jamil .................... F01D 25/166
                                                                     415/229
2010/0232959 A1*   9/2010   Takei .................... F01D 25/166
                                                                     415/229
2012/0101691 A1*   4/2012   Otsuka .................. F02D 11/105
                                                                     701/48
2013/0220285 A1*   8/2013   Hayashi .................. F02B 37/10
                                                                   123/565

FOREIGN PATENT DOCUMENTS

| JP | 2007192092 A | 8/2007 |
| JP | 2010174680 A | 8/2010 |
| JP | 2015158161 A | 9/2015 |
| WO | 2016009771 A1 | 1/2016 |
| WO | 2016027481 A1 | 2/2016 |
| WO | 2016027562 A1 | 2/2016 |
| WO | 2015031939 A1 | 3/2016 |
| WO | 2015339921 A1 | 3/2016 |

OTHER PUBLICATIONS

First Office Action, App. No. JP 2017-242254, Date of Drafting Jul. 23, 2018, 8 Pages.

International Search Report, App. No. PCT/JP2018/019121, dated Jul. 31, 2018, 11 Pages.

* cited by examiner

VIBRATION SUPPRESSION METHOD AND VIBRATION SUPPRESSION APPARATUS FOR TURBOCHARGER CAPABLE OF BEING DRIVEN BY MOTOR

TECHNICAL FIELD

The present disclosure relates to vibration suppression for a turbocharger including a motor.

BACKGROUND

A typically known turbocharger compresses gas such as air to increase its density, and supplies the gas as a combustion gas to a combustion chamber of an engine (internal combustion engine). A turbocharger includes a rotor shaft (rotational shaft), and a turbine and a compressor disposed on either end of the rotor shaft. The turbocharger converts energy of exhaust gas discharged from a combustion chamber of an internal combustion engine to an exhaust channel into rotational energy with the turbine to drive the compressor, and compresses gas such as air to supply a combustion gas to the combustion chamber. With the turbocharger provided for the engine, it is possible to achieve the same engine output with less fuel, which makes it possible to improve the engine output and to reduce the amount of fuel consumption. On the other hand, the turbine is driven depending on the energy of exhaust gas, and thus the advantageous effect of the turbocharger is small during low-load operation of the engine when the flow rate of exhaust gas is small. For instance, ships occasionally sail in a low-speed operating range to cut the amount of fuel consumption (fuel cost), where the engine is at low load and the flow rate of exhaust gas is small, resulting in a remarkable shortage in the capacity of the turbocharger.

In view of this, developed is an electric-assisted turbocharger including a motor (electric motor) capable of rotating a rotor shaft independently from exhaust gas (see Patent Document 1, for instance). For an engine equipped with an electric-assisted turbocharger, shortage in its capacity is made up by increasing the rotation speed of the rotor shaft with the motor during low-load operation. On the other hand, while the engine is in a high-load operating range, energy of exhaust gas is sufficient and thus the motor is stopped. Further, as a type of electric-assisted turbocharger, known is a hybrid turbocharger, which supplies compressed air similarly to an electric-assisted turbocharger but also recovers excessive energy of exhaust gas as electric power during high-load operation of the above engine.

As a structure of such an electric-assisted turbocharger, known is a motor over-hung structure with a small motor mounted to a shaft-extended portion extended from a compressor-side end portion of a rotor shaft (see Patent Document 1). With the motor over-hung structure, two bearings are normally provided to support the rotor shaft, which can also support the weight of the small motor sufficiently. Thus, it is unnecessary to provide another bearing dedicated to supporting the motor. However, when an electric-assisted turbocharger has a heavy object (the motor) disposed on a tip of the rotor shaft positioned outside the bearings, the heavy object is likely to cause shaft vibration, which may generate undesirable noises. For instance, Patent Document 2 discloses a method for reducing noise and vibration of an electric turbocharger (supercharger), by providing an elastic material between a turbocharger, an electric motor, and a casing that houses an inverter, and also applying a sound-absorbing material to ducts. Vibration noises are mainly caused by propagation of shaft vibration of the rotor shaft to the casing or the like, and thus Patent Document 2 can reduce such noises by blocking the propagation of vibration with the elastic member.

CITATION LIST

Patent Literature

Patent Document 1: JP2015-158161A
Patent Document 2: JP2010-174680A

Non-Patent Literature

Shiraishi Keiichi, Yoshihisa Ono, Yukio Yamashita, and Musashi Sakamoto. "Energy Savings through Electric-assist Turbocharger for Marine Diesel Engines." Mitsubishi Heavy Industries Technical Review 52.1 (2015): 36. Web. 28 Nov. 2016. (URL :http://www.mhi.co.jp/technology/review/pdf/e521/e521036. pdf)

SUMMARY

Problems to be Solved

An electric-assisted turbocharger with the motor over-hung structure disclosed in Patent Document 1 generates strong vibration when operating at a critical speed. The present inventors conducted intensive researches and found that strong vibration occurs when an electric-assisted turbocharger operates at a critical speed while the motor is not active (inactive state) such as while rotation of the rotor shaft is not assisted by the motor, or while the motor is not generating power (see FIGS. 3A and 3B described below).

In view of the above, an object of at least one embodiment of the present invention is to provide a vibration suppression method for a turbocharger, whereby it is possible to suppress shaft vibration of the rotor shaft that occurs while a motor is in an inactive state.

Solution to the Problems (1) A method of suppressing shaft vibration of a turbocharger capable of being driven by a motor, according to at least one embodiment of the present invention, comprises: a specific-vibration-state determination step of determining whether a rotor shaft of the turbocharger is in a specific vibration state in which a magnitude of shaft vibration of the rotor shaft is, or is likely to be, greater than a predetermined magnitude; an excited state determination step of determining whether the motor is in an excited state in which an exciting voltage is applied to the motor; and a vibration suppression execution step of applying the exciting voltage to the motor if it is determined that the rotor shaft is in the specific vibration state in the specific-vibration-state determination step and it is determined that the motor is not in the excited state in the excited state determination step.

Normally, the motor is in an excited state of being excited when the motor is active (active state) such as when the motor is assisting rotation of the rotor shaft or when the motor is generating power. When the motor is in the excited state, a voltage (exciting voltage) for exciting is applied to a stator (coil) of the motor so that electric current flows through the stator, and thereby the stator generates a magnetic force.

The present inventors found that the motor rotor gets attracted to the stator by a magnetic force (attracting force)

from the stator of the motor in an excited state and thereby relative movement of the motor rotor with respect to the stator is suppressed, which makes it possible to reduce the shaft vibration level of the rotor shaft mounted to the motor rotor.

With the above configuration (1), an exciting voltage is applied to the motor if it is determined that the motor is not in the excited state and that the rotor shaft is in the specific vibration state of vibrating at such a level that requires vibration suppression. With the motor brought into the excited state as described above, it is possible to suppress relative movement of the motor rotor with respect to the stator with a magnetic force (attracting force) from the stator generated in the excited state, which makes it possible to reduce shaft vibration of the rotor shaft that is connected to the motor rotor to be rotated with the motor rotor.

(2) In some embodiments, in the above configuration (1), the specific-vibration-state determination step includes: a vibration acquisition step of obtaining a vibration detection value of the shaft vibration of the rotor shaft; and a vibration determination step of determining that the rotor shaft is in the specific vibration state in which the magnitude of the shaft vibration of the rotor shaft is greater than the predetermined magnitude, if the vibration detection value obtained in the vibration acquisition step is greater than a predetermined vibration threshold.

With the above configuration (2), it is possible to determine whether the magnitude of shaft vibration of the rotor shaft is greater than a predetermined magnitude (whether the rotor shaft is in the specific vibration state), on the basis of the vibration detection value obtained by directly detecting the shaft vibration of the rotor shaft.

(3) In some embodiments, in the above configuration (1), the specific-vibration-state determination step includes: an actual turbo rotation speed acquisition step of obtaining an actual turbo rotation speed of the rotor shaft; and a critical speed range exceedance determination step of determining that the rotor shaft is in the specific vibration state in which the magnitude of the shaft vibration of the rotor shaft is likely to be greater than the predetermined magnitude, if the actual turbo rotation speed obtained in the actual turbo rotation speed acquisition step is within a critical speed range of the rotor shaft.

With the above configuration (3), it is possible to determine whether there is a possibility that the magnitude of shaft vibration of the rotor shaft is greater than a predetermined magnitude (whether the rotor shaft is in the specific vibration state), on the basis of the rotation speed (actual turbo rotation speed) of the rotor shaft.

(4) In some embodiments, in the above configuration (3), the method further comprises a critical speed range correction step of correcting an extent of the critical speed range. The critical speed range correction step includes: a bearing temperature acquisition step of obtaining a bearing temperature of a bearing of the rotor shaft; and a correction execution step of correcting the extent of the critical speed range on the basis of the bearing temperature obtained in the bearing temperature acquisition step.

With the above configuration (4), for instance, the critical speed range is corrected on the basis of the bearing temperature obtained on the basis of the lubricant oil temperature or the metal temperature of a bearing. Accordingly, upon determination of the specific vibration state on the basis of whether the magnitude of shaft vibration is likely to be greater than a predetermined magnitude on the basis of the actual turbo rotation speed, it is possible to take account of the actual operational condition of the turbocharger, and thus it is possible to determine the specific vibration state on the basis of the actual turbo rotation speed more accurately.

(5) In some embodiments, in the above configuration (1), the specific-vibration-state determination step includes: a bearing temperature acquisition step of obtaining a bearing temperature of a bearing of the rotor shaft; and a bearing temperature determination step of determining that the rotor shaft is in the specific vibration state in which the magnitude of the shaft vibration of the rotor shaft is likely to be greater than the predetermined magnitude, if the bearing temperature obtained in the bearing temperature acquisition step is greater than a predetermined bearing temperature threshold.

With the above configuration (5), it is possible to determine whether there is a possibility that the magnitude of shaft vibration of the rotor shaft is greater than a predetermined magnitude (whether the rotor shaft is in the specific vibration state), on the basis of the bearing temperature of the bearing supporting the rotor shaft.

(6) In some embodiments, in any one of the above configurations (1) to (5), the motor is mounted to an end portion of the turbocharger on a compressor side.

With the above configuration (6), the electric-assisted turbocharger has the over hung structure. In the over hung structure, a heavy object (motor) disposed on a tip on the outer side of the bearing on the rotor shaft tends to cause shaft vibration. Thus, with the above configuration, it is possible to effectively suppress shaft vibration of the electric-assisted turbocharger having the over hung structure.

(7) In some embodiments, in the above configuration (6), the motor includes a stator disposed so as to surround the rotor shaft, the stator including a plurality of elemental stators disposed in series along the rotor shaft, and the vibration suppression execution step includes applying the exciting voltage to a target elemental stator comprising at least one elemental stator of the plurality of elemental stators, the target elemental stator being determined for each of vibration modes of the rotor shaft.

With the above configuration (7), the stator of the motor includes a plurality of elemental stators disposed along the axial direction of the rotor shaft. The rotor shaft vibrates at different amplitudes and positions depending on the vibration modes (e.g. the primary, secondary, tertiary vibration mode). Thus, instead of applying an exciting voltage to all of the elemental stators upon execution of vibration suppression, an exciting voltage is applied to limited elemental stators (target elemental stator) alone, by limiting to at least a part of the plurality of elemental stators in accordance with the magnitude of vibration, or by limiting to elemental stators disposed on a section where the amplitude becomes greater in each vibration mode. Accordingly, it is possible to cut power consumption compared with a case in which an exciting voltage is applied to all of the elemental stators, which makes it possible to suppress vibration of the rotor shaft while saving power.

(8) In some embodiments, in any one of the above configurations (1) to (7), the method further comprises a vibration suppression execution prohibition step of prohibiting execution of the vibration suppression execution step. The vibration suppression execution prohibition step includes: an equipment temperature acquisition step of obtaining an equipment temperature of equipment including at least one of the motor or an inverter for driving the motor; and a prohibition execution step of prohibiting execution of the vibration suppression execution step if the equipment temperature is equal to or greater than a predetermined equipment temperature threshold.

With the above configuration (8), execution of vibration suppression is prohibited if the equipment temperature is excessively high. Accordingly, it is possible to prevent further increase of the equipment temperature due to execution of vibration suppression, thus protecting the equipment.

(9) In some embodiments, in the above configuration (8), the method further comprises a notification step of notifying execution of the vibration suppression execution prohibition step.

With the above configuration (9), it is possible to notify an outside party such as an operator and an exterior system about prohibition of execution of the vibration suppression execution step. In other words, it is possible to inform an outside party that vibration (noise) of a motor-driven turbocharger cannot be suppressed.

(10) A vibration suppression apparatus for a turbocharger according to at least one embodiment of the present invention is configured to suppress shaft vibration of a turbocharger capable of being driven by a motor, and comprises: a specific vibration state determination part configured to determine whether a rotor shaft of the turbocharger is in a specific vibration state in which a magnitude of shaft vibration of the rotor shaft is, or is likely to be, greater than a predetermined magnitude; an excited state determination part configured to determine whether the motor is in an excited state in which an exciting voltage is applied to the motor; and a vibration-suppression execution part configured to apply the exciting voltage to the motor if it is determined that the rotor shaft is in the specific vibration state by the specific vibration state determination part and it is determined that the motor is not in the excited state by the excited state determination part.

With the above configuration (10), it is possible to achieve the same effect as the above (1).

(11) In some embodiments, in the above configuration (10), the specific vibration state determination part includes: a vibration detection value acquisition part configured to obtain a vibration detection value of the shaft vibration of the rotor shaft; and a vibration determination part configured to determine that the rotor shaft is in the specific vibration state in which the magnitude of the shaft vibration of the rotor shaft is greater than the predetermined magnitude, if the vibration detection value obtained by the vibration detection value acquisition part is greater than a predetermined vibration threshold.

With the above configuration (11), it is possible to achieve the same effect as the above (2).

(12) In some embodiments, in the above configuration (10), the specific vibration state determination part includes: an actual turbo rotation speed acquisition part configured to obtain an actual turbo rotation speed of the rotor shaft; and a critical speed range exceedance determination part configured to determine that the rotor shaft is in the specific vibration state in which the magnitude of the shaft vibration of the rotor shaft is likely to be greater than the predetermined magnitude, if the actual turbo rotation speed obtained by the actual turbo rotation speed acquisition part is within a critical speed range of the rotor shaft.

With the above configuration (12), it is possible to achieve the same effect as the above (3).

(13) In some embodiments, in the above configuration (12), the vibration suppression apparatus further comprises a critical-speed-range correction part configured to correct an extent of the critical speed range. The critical-speed-range correction part includes: a bearing-temperature acquisition part configured to obtain a bearing temperature of a bearing of the rotor shaft; and a correction execution part configured to correct the extent of the critical speed range on the basis of the bearing temperature obtained by the bearing-temperature acquisition part.

With the above configuration (13), it is possible to achieve the same effect as the above (4).

(14) In some embodiments, in the above configuration (10), the specific vibration state determination part includes: a bearing-temperature acquisition part configured to obtain a bearing temperature of a bearing of the rotor shaft; and a bearing temperature determination part configured to determine that the rotor shaft is in the specific vibration state in which the magnitude of the shaft vibration of the rotor shaft is likely to be greater than the predetermined magnitude, if the bearing temperature obtained by the bearing-temperature acquisition part is greater than a predetermined bearing temperature threshold.

With the above configuration (14), it is possible to achieve the same effect as the above (5).

(15) In some embodiments, in any one of the above configurations (10) to (14), the motor is mounted to an end portion of the turbocharger on a compressor side.

With the above configuration (15), it is possible to achieve the same effect as the above (6).

(16) In some embodiments, in the above configuration (15), the motor includes a stator disposed so as to surround the rotor shaft, the stator including a plurality of elemental stators disposed in series along the rotor shaft. The vibration-suppression execution part is configured to apply the exciting voltage to a target elemental stator comprising at least one elemental stator of the plurality of elemental stators, the target elemental stator being determined for each of vibration modes of the rotor shaft.

With the above configuration (16), it is possible to achieve the same effect as the above (7).

(17) In some embodiments, in the above configuration (16), the target elemental stator includes an elemental stator, disposed closest to the end portion of the turbocharger on the compressor side, of the plurality of elemental stators.

With the above configuration (17), the elemental stator closest to the compressor-side end portion of the rotor shaft is always included in the target elemental stator regardless of the type (the order) of vibration mode. Herein, the present inventors focused on that the amplitude tends to be the greatest at the compressor-side end portion of the rotor shaft, in any of the vibration modes. As described above, it is possible to suppress vibration of the rotor shaft more efficiently by including the elemental stator closest to the compressor-side end portion of the rotor shaft in the target elemental stator, regardless of the type (order) of the vibration mode.

(18) In some embodiments, in any one of the above configurations (10) to (17), the vibration suppression apparatus further comprises a vibration-suppression execution prohibition part configured to prohibit execution of the vibration-suppression execution part.

The vibration-suppression execution prohibition part includes: an equipment temperature acquisition part configured to obtain an equipment temperature of equipment including at least one of the motor or an inverter for driving the motor; and a prohibition execution part configured to prohibit execution of the vibration-suppression execution part if the equipment temperature is equal to or greater than a predetermined equipment temperature threshold.

With the above configuration (18), it is possible to achieve the same effect as the above (8).

(19) In some embodiments, in the above configuration (18), the vibration suppression apparatus further comprises a notification part configured to notify execution of the vibration-suppression execution prohibition part.

With the above configuration (19), it is possible to achieve the same effect as the above (9).

(20) A turbocharger according to at least one embodiment of the present invention comprises: a rotor shaft; a motor capable of driving the turbocharger and of applying a rotational force to the rotor shaft with electric power; a turbine wheel driven by exhaust gas discharged from an engine; a compressor wheel coupled to the turbine wheel via the rotor shaft; and the vibration suppression apparatus for a turbocharger according to any one of the above (10) to (19).

With the above configuration (20), it is possible to achieve the same effect as each of the above (10) to (19).

Advantageous Effects

According to at least one embodiment of the present invention, it is possible to provide a vibration suppression method for a turbocharger, whereby it is possible to suppress shaft vibration of the rotor shaft that occurs while a motor is in an inactive state.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention. For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
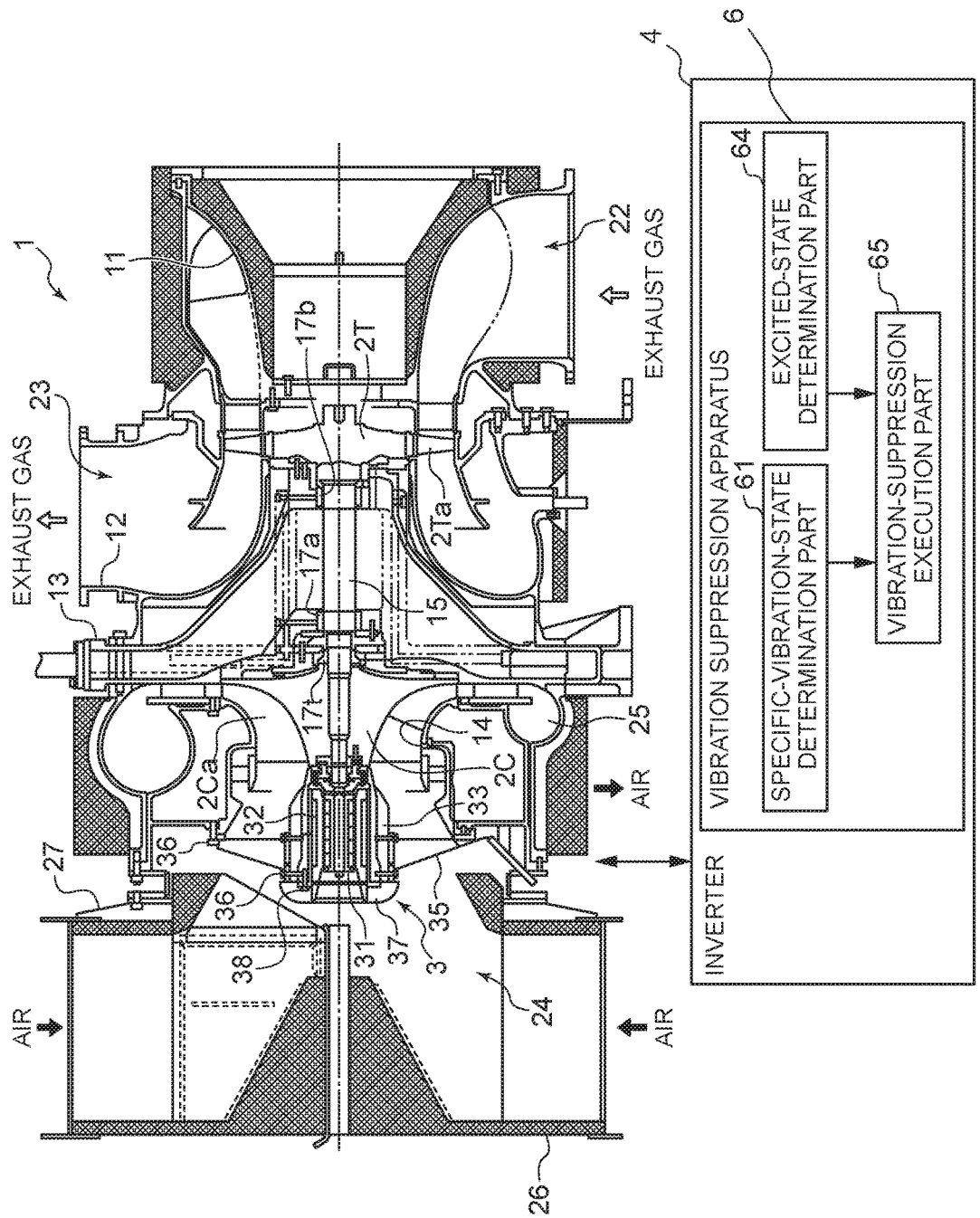
FIG. 1 is a diagram showing a vibration suppression apparatus for a turbocharger and a part of an electric-assisted turbocharger according to an embodiment of the present invention.
Figure 2:
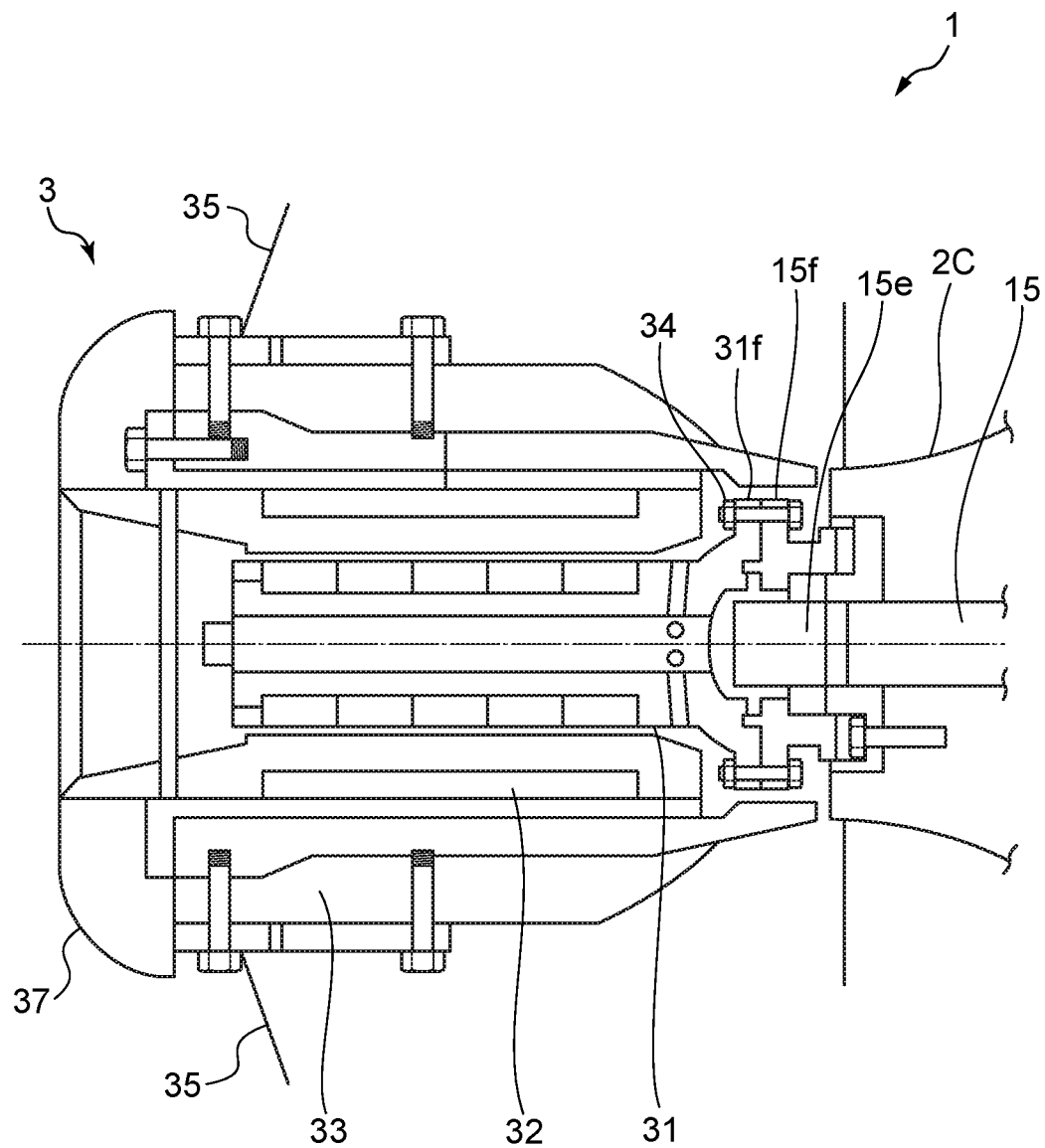
FIG. 2 is an enlarged view of the motor shown in FIG. 1 and its peripheral structure.
Figure 3A:
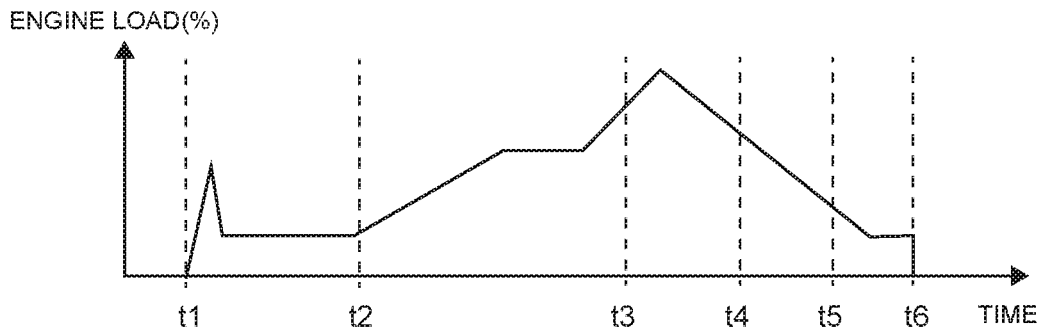
FIG. 3A is a diagram for describing the timing at which supercharging is performed by an electric-assisted turbocharger according to an embodiment of the present invention, showing a relationship between an engine load and a scavenging pressure.
Figure 3B:
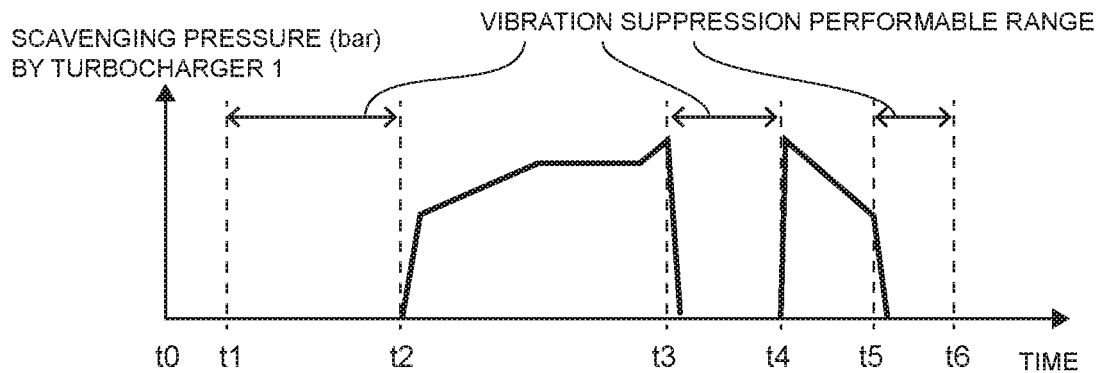
FIG. 3B is a diagram for describing the timing at which supercharging is performed by an electric-assisted turbocharger according to an embodiment of the present invention, showing a relationship between an engine load and a scavenging pressure.
Figure 4:
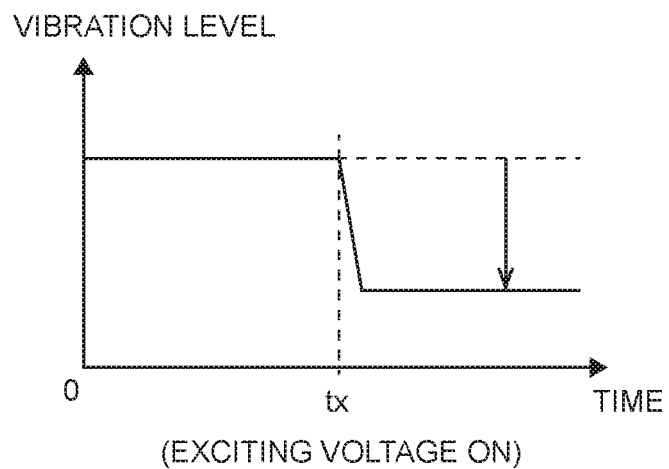
FIG. 4 is a diagram for describing an effect to reduce a shaft-vibration level by exciting a motor of an electric-assisted turbocharger according to an embodiment of the present invention.

FIG. 1 is a diagram showing a vibration suppression apparatus 6 for a turbocharger and a part of an electric-assisted turbocharger 1 according to an embodiment of the present invention. FIG. 2 is an enlarged view of the motor 3 shown in FIG. 1 and its peripheral structure. FIGS. 3A and 3B are diagrams for describing the timing at which supercharging is performed by the electric-assisted turbocharger 1 according to an embodiment of the present invention, showing a relationship between an engine load and a scavenging pressure. FIG. 4 is a diagram for describing an effect to reduce a shaft-vibration level by exciting the motor 3 of the electric-assisted turbocharger 1 according to an embodiment of the present invention.

In the following example, shaft vibration of the electric-assisted turbocharger 1 is suppressed by a vibration suppression apparatus 6 for a turbocharger (hereinafter, also referred to as merely a vibration suppression apparatus 6) and a method of suppressing shaft vibration of a turbocharger (hereinafter, also referred to as merely a vibration suppression method). However, the electric-assisted turbocharger 1 may be a hybrid turbocharger capable of supplying compressed gas similarly to the electric-assisted turbocharger 1 described below. Besides supplying compressed gas like the electric-assisted turbocharger 1, a hybrid turbocharger is capable of recovering excessive energy of exhaust gas when an engine is operating in a high-load operational range in which a sufficient amount of exhaust gas energy can be obtained.

The electric-assisted turbocharger 1 is a turbocharger configured such that a turbine wheel 2T disposed in an exhaust channel of an engine rotates in response to exhaust gas, and thereby a compressor wheel 2C coupled to the turbine wheel 2T via a rotor shaft 15 rotates to compress gas such as air in a scavenging channel that flows toward a combustion chamber of the engine. Further, the electric-assisted turbocharger 1 includes a motor 3 (electric motor) capable of applying a rotational force to the rotor shaft 15 with electric power. The motor 3 is configured to assist rotation of the rotor shaft 15 by applying a rotational force to the rotor shaft 15 with electric power if energy of exhaust gas for driving the turbine wheel 2T is in sufficient, when, for instance, the engine is operating in a low-load operational range.

In the following example described with reference to FIGS. 1 to 18, the electric-assisted turbocharger 1 is provided for a two-cycle diesel engine of a uni-flow scavenging system, which is a propulsion engine for large ships. Further, the turbocharger 1 can refer to a hybrid turbocharger and the electric-assisted turbocharger 1. In a two-cycle diesel engine of a uni-flow scavenging system, scavenging air flows into a cylinder, when a piston gets pushed down by combustion and explosion of fuel below a scavenging port disposed on the lower part of the cylinder. At this time, an exhaust valve disposed on the upper part of the cylinder opens, and thereby exhaust gas and combustion gas are exchanged, so that the piston moves upward again to compress the combustion gas. For this reason, the turbocharger 1 described below is used.

As depicted in FIG. 1, the turbocharger 1 includes an exhaust-inlet casing 11, an exhaust-outlet casing 12, a bearing mount 13, and an air guide casing 14 on the compressor side, which are all fastened with bolts (not depicted) to form a single piece. The rotor shaft 15 is supported rotatably by a thrust bearing 17t and radial bearings 17a, 17b disposed inside the bearing mount 13. A turbine wheel 2T constituting a turbine (turbine part) is coupled to an end portion of the rotor shaft 15, and a compressor wheel 2C constituting a compressor (compressor part) is coupled to the other end portion of the rotor shaft 15. The turbine wheel 2T has a plurality of blades 2Ta on the outer peripheral part. The blades 2Ta of the turbine wheel 2T are disposed between an exhaust-intake path 22 disposed in the exhaust-inlet casing 11 for taking exhaust gas into the turbine wheel 2T and an exhaust discharge path 23 disposed in the exhaust-outlet casing 12 for guiding exhaust gas from the turbine wheel 2T to outside. The compressor wheel 2C has a plurality of blades 2Ca on the outer peripheral part. The blades 2Ca of the compressor wheel 2C are disposed between an intake-air guide path 24 disposed in the air guide casing 14 being a part of the turbocharger casing for guiding air to the compressor wheel 2C, and a scroll chamber 25 into which combustion gas compressed by the compressor wheel 2C flows. The scroll chamber 25 is connected to the downstream side of a scavenging channel (not depicted), and combustion gas flows through the scroll chamber 25 and toward the combustion chamber of the engine.

The turbocharger 1 of the embodiment depicted in FIGS. 1 to 4 includes a silencer 26 on the upstream side of the intake-air guide path 24. The silencer 26 is disposed on the upstream side of an inlet section of the intake-air guide path 24, and has a noise-canceling function to absorb noise generated from suction of air. The silencer 26 is supported on the air guide casing 14 via an intermediate piece 27. The same shall apply to the following embodiments depicted in FIGS. 6 to 18.

The motor 3 of the turbocharger 1 includes a motor rotor 31, a stator 32, and a housing 33, as depicted in FIGS. 1 and 2, as well as in FIGS. 6, 8, 11, and 15 described below. The motor 3 is mounted to a shaft extended portion 15e which is extended from a compressor-side end portion of the rotor shaft, thus having a motor over-hung structure where no dedicated bearing is provided for the motor 3. In other words, the motor 3 is supported by a thrust bearing 17t and radial bearings 17a, 17b supporting the rotor shaft 15 (see FIG. 1).

In the embodiments depicted in FIGS. 1 and 2 (the same applies to FIGS. 6, 8, 11, and 15 described below), a motor rotor 31 is provided, which is a cylindrical member having a permanent magnet on the outer peripheral surface of the motor rotor 31. The motor rotor 31 is mounted to the rotor shaft 15 by fastening a flange 15f disposed on the shaft extended portion 15e on the end portion of the rotor shaft 15 with a flange 31f disposed on an end portion (root end) of the motor rotor 31 with a plurality of bolts and nuts 34. Further, the stator 32 is housed in a housing 33 of a cylindrical shape so as to surround the outer periphery of the motor rotor 31 with a gap therebetween. In other words, the motor rotor 31 is disposed in a hollow section formed inside the stator 32, so as not to be in contact with the stator 32. The housing 33 is supported on the air guide casing 14 via a support member 35, and a cap 37 is fixed to a tip portion of the housing 33 with a bolt 38.

Further, the motor 3 of the turbocharger 1 is a three-phase AC motor, for instance, driven by a motor controller (e.g. inverter 4) for controlling the motor 3. The motor controller is configured to apply an exciting voltage to the motor 3 to bring the motor 3 into an excited state, and to rotate the direction of the magnetic field generated by the exciting voltage to rotate the motor rotor 31, which can be performed independently and separately. That is, the motor 3 enters a state in which a rotational force is applied to the motor rotor 31 (motor active state) when an exciting voltage is applied and the direction of the magnetic field of the stator 32 generated by application of the exciting voltage is turned. On the other hand, if an exciting voltage is applied to the motor 3 but the direction of the magnetic field of the stator 32 generated by application the exciting voltage is not turned, a rotational force is not applied to the motor rotor 31, and an excited restriction state is maintained, where the motor rotor 31 is merely attracted by a magnetic force from the stator 32.

In the embodiment depicted in FIGS. 1 and 2 (the same applies to FIGS. 6, 8, 11 and 16 described below), the above described motor controller is an inverter 4 capable of rotating the motor rotor 31 at a target rotation speed by controlling a voltage (exciting voltage) and a frequency to be applied to the stator 32. More specifically, the inverter 4 periodically switches the three phases of the stator 32 applied with electric current, by periodically switching a plurality of switching elements such as transistors (e.g. six transistors) of the inverter 4. Accordingly, the phases are switched in order so that the direction of the magnetic field of the stator 32 rotates in one direction, and thereby the rotating magnetic field attracts the magnet (permanent magnet) of the motor rotor 31, thus resulting in rotation of the motor rotor 31. In other words, the inverter 4 is capable of bringing the motor 3 into the motor active state by applying an exciting voltage to the motor 3 and switching the direction of electric current that flows through the stator 32 (coil) so as to generate the above described rotating magnetic field. Furthermore, the inverter 4 is capable of bringing the motor 3 into the excited restriction state, by applying an exciting voltage of zero frequency to the stator 32.

The motor 3 of the turbocharger 1 having the above described configuration is configured to be turned on and off in accordance with the operational state of the engine. The motor 3 is in the above described motor active state when turned on, and application of an exciting voltage is stopped when turned off (inactive state). The timing of switching on/off of the motor 3 will be described with reference to FIGS. 3A and 3B. FIGS. 3A and 3B show a change in an engine load (%) as illustrated in FIG. 3A, and accompanying generation of a scavenging pressure by the turbocharger 1 as shown in FIG. 3B. In some other embodiments, an electric assist blower of a two-stroke engine for ships may be mounted to a compressor outlet of the turbocharger to generate a scavenging pressure by switching on and off of the assist blower. The assist blower may generate a scavenging pressure before time t1 and after time t5 described below. The assist blower includes a centrifugal impeller wheel and an induction motor operated at a constant rotation speed, and is configured to automatically start and stop (on/off) in response to a change in the scavenging pressure of an engine. The assist blower is not a requirement and the engine may not necessarily include the assist blower in some other embodiments.

Now, FIGS. 3A and 3B will be described in detail. The engine starts to operate at time t1, and is in an idling state until time t2. Then, the engine load starts to increase from time t2, when the ship starts to sail, for instance, and the engine load increases in stages until after time t3 (see FIG. 3A).

In the period between time t2 and time t3, the engine is operating in a low-load state. Thus, as shown in FIG. 3B with a thick solid line, the motor 3 of the turbocharger 1 is turned on between time t2 and time t3, the motor 3 applying a rotational force to the rotor shaft 15 to assist rotation of the rotor shaft 15 driven by exhaust gas. In the period from time t3 to time t4, when the engine operates in a high-load state, exhaust gas has sufficient energy for driving the turbine wheel 2T, and thus the motor 3 of the turbocharger 1 is turned off. If the turbocharger 1 is a hybrid turbocharger, the motor 3 may be used as a generator during the above described period from time t3 to time t4, so as to recover excessive energy of exhaust gas by using the motor 3.

Further, as shown in FIG. 3A, after time t3, the engine load reaches its peak between time t3 and time t4. After the peak, and past time t4 and time t5, the engine stops at time t6. At time t4, after the peak of the engine load, the operational state of the engine returns to the low-load state, and thus the motor 3 of the turbocharger 1 is turned on. In this state, at time t5, it is determined that assist by the motor 3 of the turbocharger 1 is no longer necessary, and the motor 3 is turned off.

As described above, in the embodiment depicted in FIGS. 3A and 3B, with the turbocharger 1 compressing air while switching on/off of the motor 3 in accordance with the engine load, upon rotation of the rotor shaft 15 of the turbocharger 1, for instance, shaft vibration of the rotor shaft 15 occurs due to unbalance of the rotor shaft 15 itself and vibration of the bearings 17 (thrust bearing 17t, radial bearings 17a, 17b) of the rotor shaft 15. The present inventors found that such shaft vibration is relatively more evident when the motor 3 of the turbocharger 1 is turned off. When the motor 3 is on, the motor 3 is excited and rotation of the rotor shaft 15 is assisted by the motor 3. When the motor 3 is off, the motor 3 is not excited and the rotor shaft 15 is driven to rotate by exhaust gas alone. From this, the present inventors found that, as depicted in FIG. 4, it is possible to reduce the vibration level of shaft vibration by bringing the motor 3 into an excited state while shaft vibration of the rotor shaft 15 is occurring in the turbocharger 1. As depicted in FIG. 4, if an exciting voltage is turned on at time tx when shaft vibration of the rotor shaft 15 is occurring, the vibration level drops after time tx.

That is, the present inventors found that the motor rotor 31 gets attracted to the stator 32 by a magnetic force (attracting force) from the stator 32 of the motor 3 in an excited state and thereby relative movement of the motor rotor 31 with respect to the stator 32 is suppressed, which makes it possible to reduce the shaft vibration level of the rotor shaft 15 mounted to the motor rotor 31. Particularly, with the motor 3 brought into the excited restriction state instead of the motor active state, the motor 3 does not assist the rotor shaft 15, which makes it possible to reduce the shaft vibration level of the rotor shaft 15 without affecting the scavenging pressure.

Further, the vibration suppression apparatus 6 is configured to suppress shaft vibration on the basis of the above principle, during the period of operation of the engine of the electric-assisted turbocharger 1 including the motor 3 mounted to a compressor-side end portion of the rotor shaft 15. Herein, the period of operation of an engine starts when the engine load exceeds 0% after an engine start-up, including an idling state, and ends when the engine stops.

In the example illustrated in FIGS. 3A and 3B, in the vibration-suppression performable ranges corresponding to periods between time t0 and time t2, between time t3 and time t4, and between time t5 and time t6, the motor 3 of the turbocharger 1 is not in the motor active state, and thus there is a risk of occurrence of shaft vibration of the rotor shaft 15. Thus, the vibration suppression apparatus 6 is configured to discriminate conditions corresponding to the above vibration-suppression performable ranges, and to bring the motor 3 into the excited state if needed. In an embodiment with an assist blower (not depicted) mounted to the engine, shaft vibration may be generated by the assist blower in an on state. Also in this case, it is possible to reduce the shaft vibration level of the rotor shaft 15 similarly by switching the state of the motor 3 from a non-excited state to an excited state.

Specifically, as shown in FIG. 1 (the same applies to FIGS. 6, 8, 11, 13, and 16 described below), the vibration suppression apparatus 6 includes a specific-vibration-state determination part 61, an excited-state determination part 64, and a vibration-suppression execution part 65. The vibration suppression apparatus 6 comprises a computer, for instance, including a CPU (processor, not depicted) and a memory M (storage device) such as ROM and RAM. The CPU operates (e.g. computation of data) in accordance with program instructions loaded to a main storage device, and thereby the above functional parts of the vibration suppression apparatus 6 are implemented. Although the vibration suppression apparatus 6 is implemented as a functional part of the inverter 4 in the embodiment depicted in FIG. 1, the vibration suppression apparatus 6 may be a separate device communicably connected to a motor controller, which is the inverter 4.

Each functional part of the vibration suppression apparatus 6 will now be described.

The specific-vibration-state determination part 61 determines whether the rotor shaft 15 of the turbocharger 1 is in a specific vibration state, in which the magnitude of shaft vibration of the rotor shaft 15 is, or is likely to be, greater than a predetermined magnitude. For instance, as described below, determination of the specific vibration state in which the rotor shaft is vibrating at such a level that requires vibration suppression, may be performed on the basis of a vibration detection value F of shaft vibration that is actually measured (see FIGS. 6 and 7), on the basis of an actual turbo rotation speed V of the rotor shaft 15 of the turbocharger 1 (see FIGS. 8 to 10), or on the basis of a bearing temperature Bt of a bearing 17 of the turbocharger 1 (see FIGS. 11 and 12).

The excited-state determination part 64 determines whether the motor 3 of the turbocharger 1 is in the excited state in which an exciting voltage is applied to the motor 3.

For instance, the excited-state determination part 64 may determine whether the motor 3 is turned on, on the basis of information from the motor controller (e.g. inverter 4) obtained by communicating with a control part of the motor controller or by obtaining information in a memory of the motor controller. In this case, the motor 3 is determined to be in the excited state when the motor 3 is on. Alternatively, the determination may be based on the same logics as those for switching on/off of the turbocharger 1. For instance, the excited-state determination part 64 may confirm an engine operational state such as the engine load shown in FIGS. 3A and 3B and the engine rotation speed, to determine whether the engine is in an operational state in which the turbocharger 1 is to be turned on or off. In this case, it is determined that the motor 3 is in the excited state when the engine is in an operation state in which the turbocharger 1 to be turned on. The voltage of the motor 3 may be actually detected, and if an exciting voltage is detected, it is determined that the motor 3 is in the excited state.

The vibration-suppression execution part 65 applies an exciting voltage to the motor 3 if the specific-vibration-state determination part 61 determines that the rotor shaft 15 is in the specific vibration state and the excited-state determination part 64 determines that the motor 3 is not in the excited state. As shown in FIG. 4, it is possible to reduce the shaft vibration level by applying an exciting voltage to the motor 3.

Figure 5:
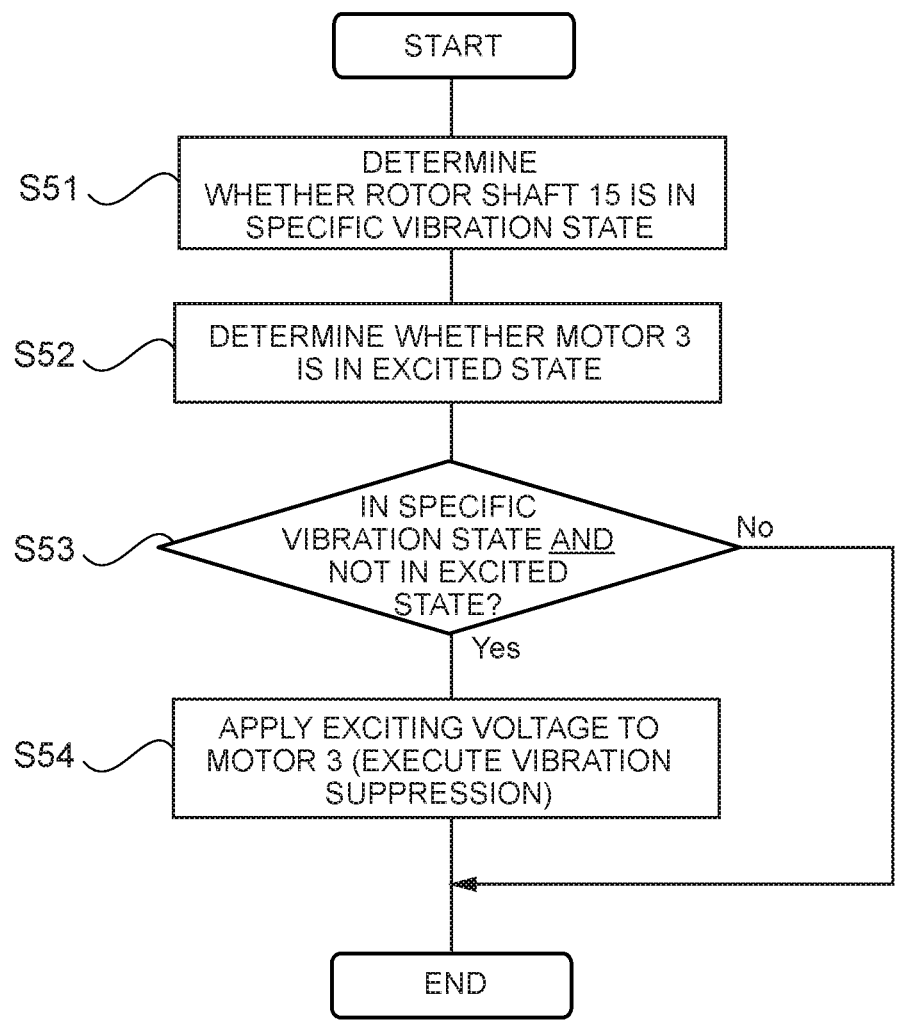
FIG. 5 is a flowchart showing a vibration suppression method for a turbocharger according to an embodiment of the present invention.

Next, the vibration suppression method (method of suppressing vibration of a turbocharger) with the above configuration will be described with reference to FIG. 5. FIG. 5 is a flowchart showing a method of suppressing vibration for a turbocharger according to an embodiment of the present invention.

As shown in FIG. 5, the vibration suppression method according to at least one embodiment of the present invention is a method of suppressing shaft vibration during operation of the engine of the electric-assisted turbocharger 1 including the motor 3 mounted to a compressor-side end portion of the rotor shaft 15, the method including a specific-vibration-state determination step (S51), an excited-state determination step (S52), and a vibration suppression execution step (S53 to S54). The vibration suppression method may be performed by the above described vibration suppression apparatus 6. Alternatively, the vibration suppression method may be performed manually by an operator monitoring the operation state of the turbocharger 1 to determine whether the motor 3 is in the specific vibration state, and performing an operation (e.g. pressing a switch) for applying an exciting voltage to the motor 3 when it is determined that the motor 3 is in the specific vibration state. The vibration suppression method will be described in accordance with the flow of FIG. 5.

In step S51 of FIG. 5, the specific-vibration-state determination step is performed. The specific-vibration-state determination step (S51) is a step of determining whether the rotor shaft 15 of the turbo charger 1 is in the specific vibration state, in which the magnitude of shaft vibration of the rotor shaft 15 is, or is likely to be, greater than a predetermined magnitude. The present step (S51) corresponds to the process executed by the above described specific-vibration-state determination part 61, and is not described again in detail.

In the next step S52, the excited-state determination step is performed. The excited-state determination step (S52) is a step of determining whether the motor 3 of the turbocharger 1 is in the excited state in which an exciting voltage is applied to the motor 3. The present step (S52) corresponds to the process executed by the above described excited-state determination part 64, and is not described again in detail.

In the subsequent steps S53 to S54, the vibration suppression execution step is performed. The vibration-suppression execution step (S53 to 54) is a step of applying an exciting voltage to the motor 3 if the specific-vibration-state determination part 61 determines that the rotor shaft 15 is in the specific vibration state and the excited-state determination part 64 determines that the motor 3 is not in the excited state. More specifically, if it is determined in step S53 that the rotor shaft 15 is in the specific vibration state and the motor 3 is in the non-excited state of not being excited, an exciting voltage is applied to the motor 3 in step S54. That is, vibration suppression is performed. On the other hand, if it is determined in step S53 that the rotor shaft 15 is not in the specific vibration state, or that the motor 3 is already in the excited state, the flow of FIG. 5 is terminated without performing vibration suppression of step S54.

With the above configuration, an exciting voltage is applied to the motor 3 if it is determined that the motor 3 is not in the excited state and that the rotor shaft 15 is in the specific vibration state of vibrating at such a level that requires vibration suppression. With the motor 3 brought into the excited state as described above, it is possible to suppress relative movement of the motor rotor 31 with respect to the stator 32 with an attracting force (magnetic force) from the stator 32 (coil) generated in the excited state, which makes it possible to reduce shaft vibration of the rotor shaft 15 that is connected to the motor rotor 31 and thus rotated with the motor rotor 31.

Next, some embodiments related to a method of determining the above described specific vibration state will be described with reference to FIGS. 6 to 18.

Figure 6:
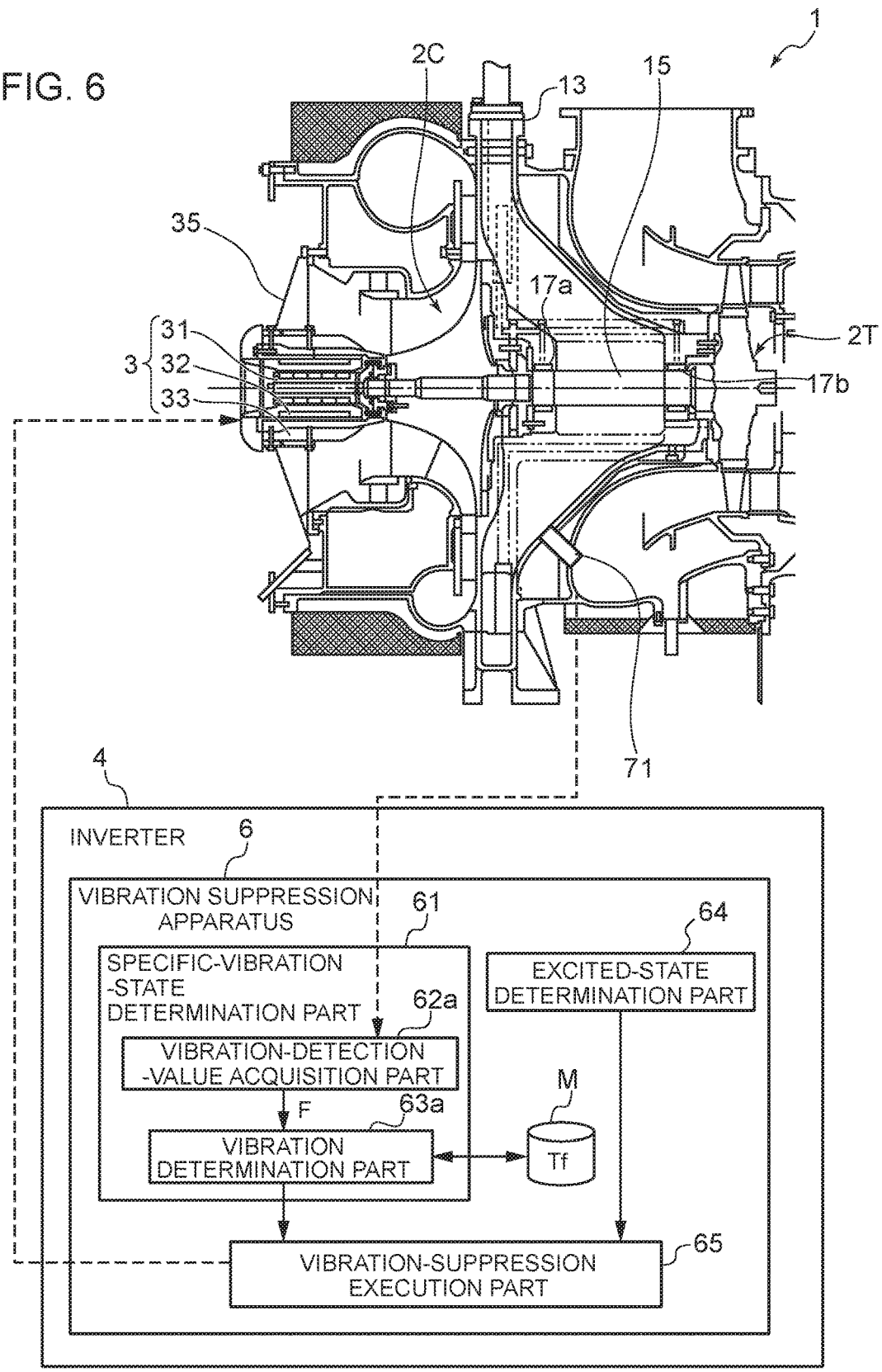
FIG. 6 is a configuration diagram of a vibration suppression apparatus for a turbocharger which determines a specific vibration state by monitoring vibration, according to an embodiment of the present invention.
Figure 7:
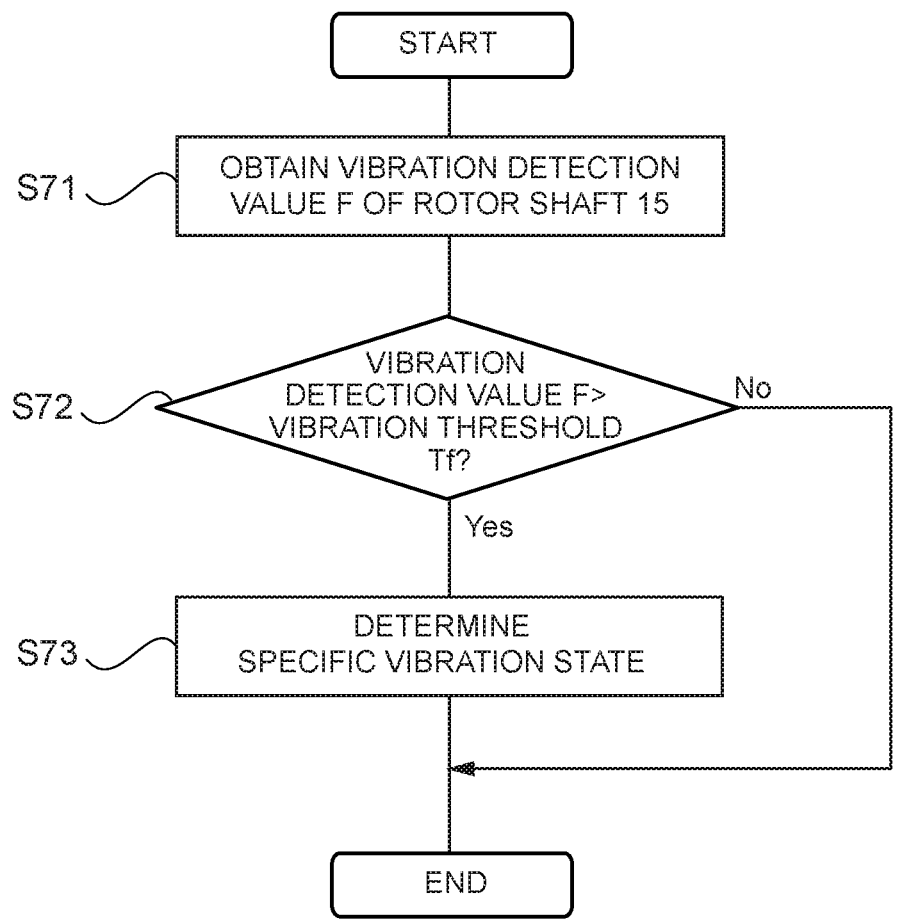
FIG. 7 is a flowchart showing in detail a specific-vibration-state determination step of a vibration suppression method for a turbocharger according to an embodiment of the present invention, determining a specific vibration state by monitoring shaft vibration.

FIGS. 6 and 7 are diagrams for describing an embodiment of monitoring a vibration detection value F obtained by actually measuring vibration. FIG. 6 is a configuration diagram of a vibration suppression apparatus 6 for a turbocharger which determines the specific vibration state by monitoring vibration, according to an embodiment of the present invention. FIG. 7 is a flowchart showing in detail the above described specific-vibration-state determination step (step S51 in FIG. 5) of the vibration suppression method for a turbocharger according to an embodiment of the present invention, which determines the specific vibration state by monitoring shaft vibration.

Figure 8:
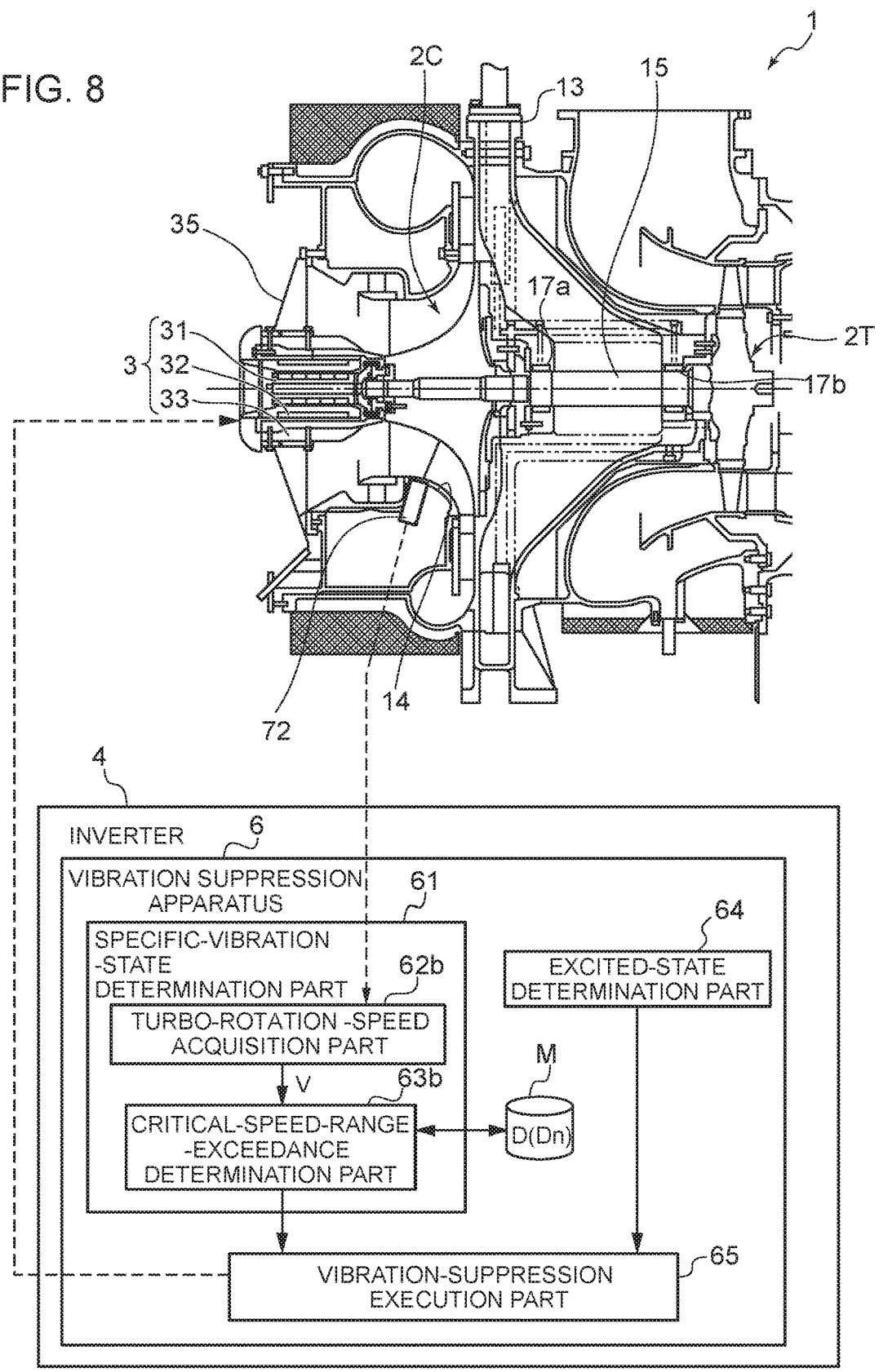
FIG. 8 is a configuration diagram of a vibration suppression apparatus for a turbocharger which determines a specific vibration state on the basis of an actual turbo rotation speed of a rotor shaft, according to an embodiment of the present invention.
Figure 9:
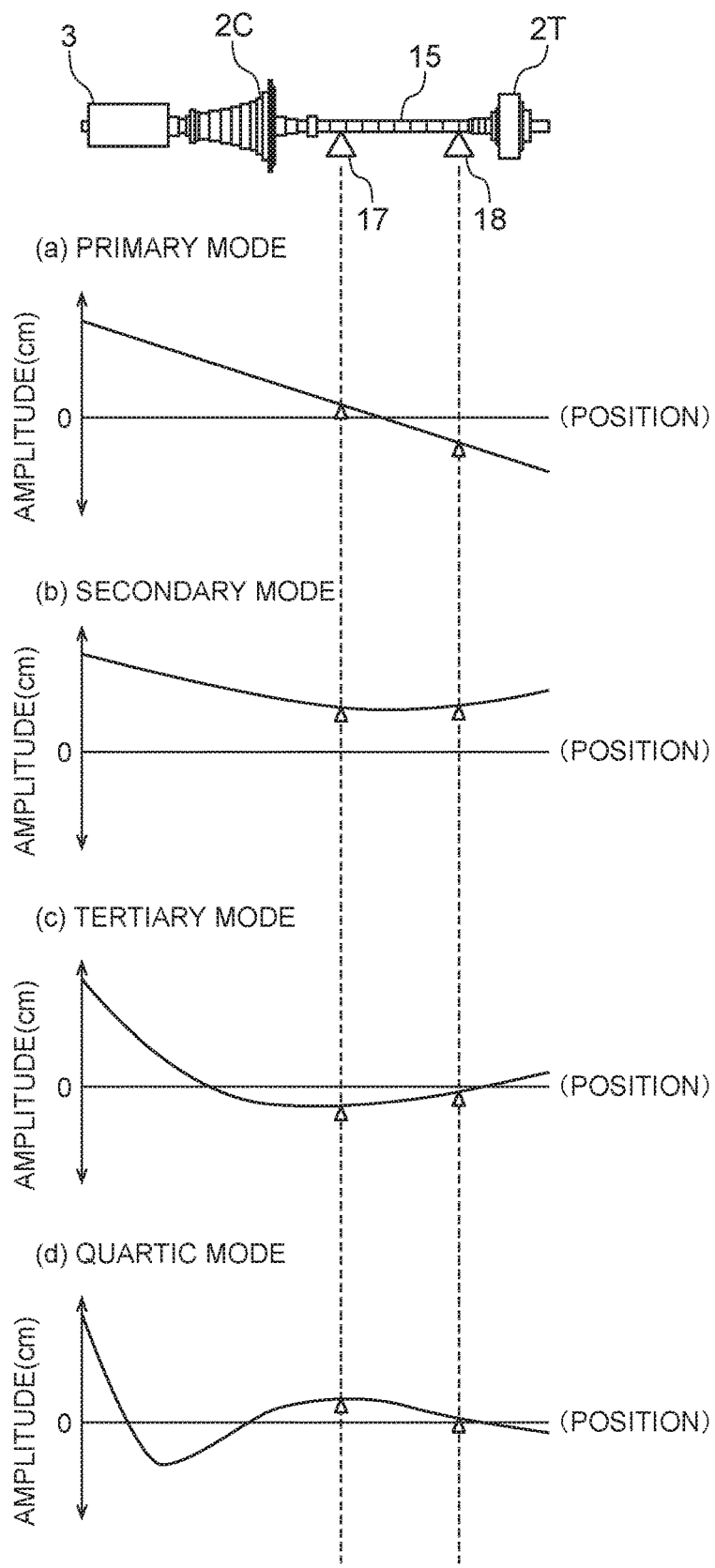
FIG. 9 is a diagram for describing a vibration mode of shaft vibration of a rotor shaft according to an embodiment of the present invention.
Figure 10:
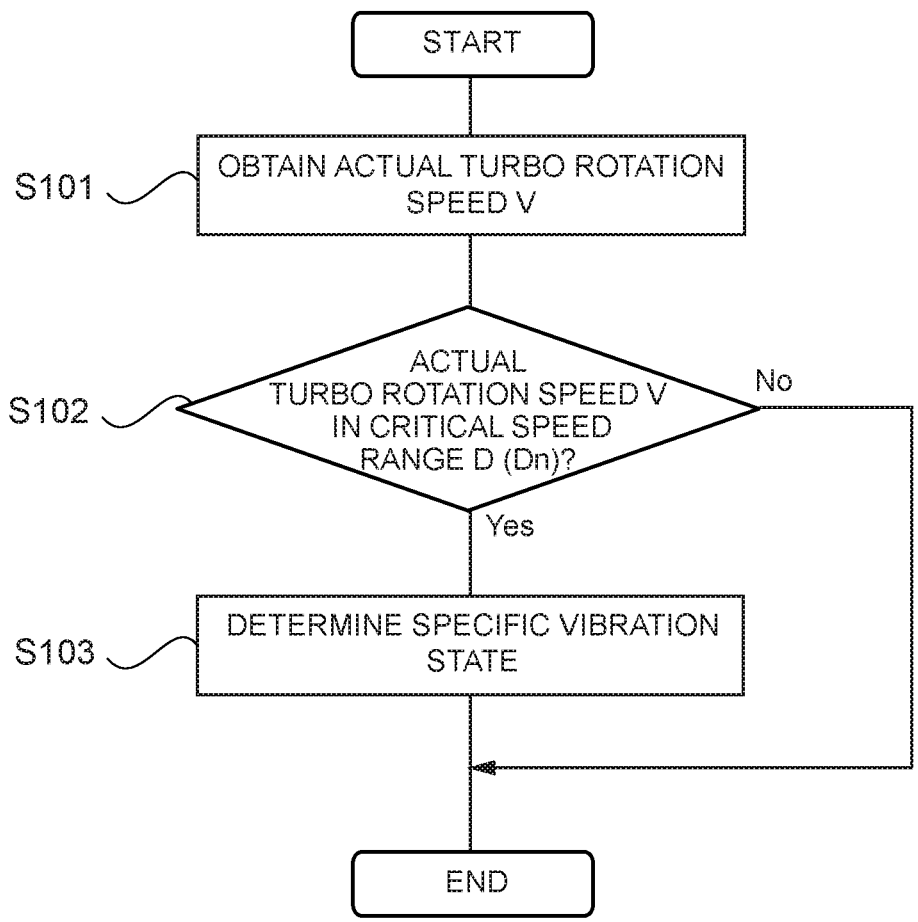
FIG. 10 is a flowchart showing in detail a specific-vibration-state determination step of a vibration suppression method for a turbocharger according to an embodiment of the present invention, which determines a specific vibration state on the basis of an actual turbo rotation speed of a rotor shaft.

FIGS. 8 to 10 are diagrams for describing an embodiment of determining the specific vibration state on the basis of the rotation speed of the rotor shaft 15 (actual turbo rotation speed V). FIG. 8 is a configuration diagram of the vibration suppression apparatus 6 for a turbocharger which determines the specific vibration state on the basis of the actual turbo rotation speed V of the rotor shaft 15, according to an embodiment of the present invention. FIG. 9 is a diagram for describing a vibration mode of shaft vibration of the rotor shaft 15 according to an embodiment of the present invention. FIG. 10 is a flowchart showing in detail the specific-vibration-state determination step (step S51 in FIG. 5) of the vibration suppression method for a turbocharger according to an embodiment of the present invention, which determines the specific vibration state on the basis of the actual turbo rotation speed V of the rotor shaft 15.

Figure 11:
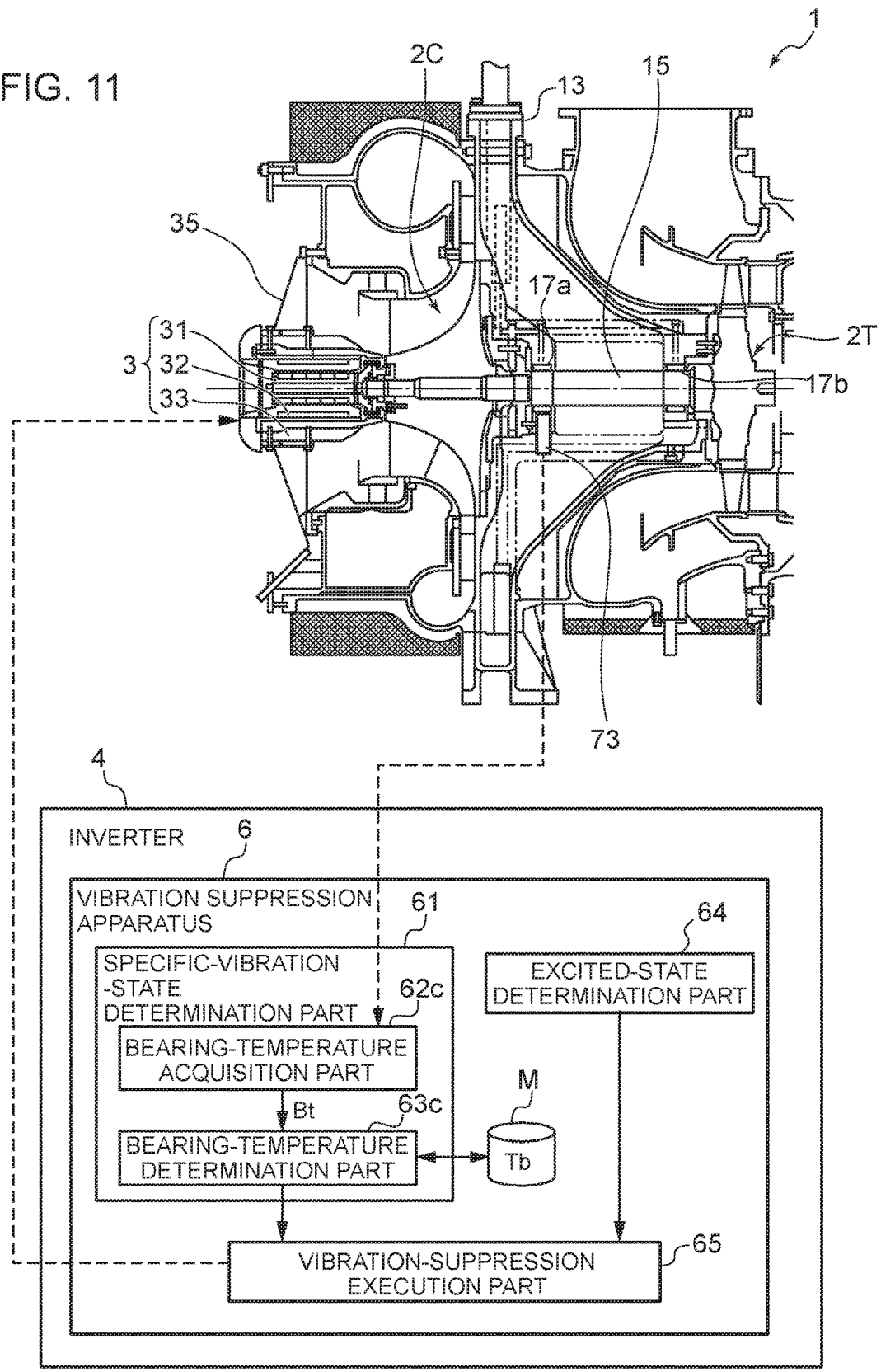
FIG. 11 is a configuration diagram of a vibration suppression apparatus for a turbocharger which determines a specific vibration state on the basis of a bearing temperature, according to an embodiment of the present invention.
Figure 12:
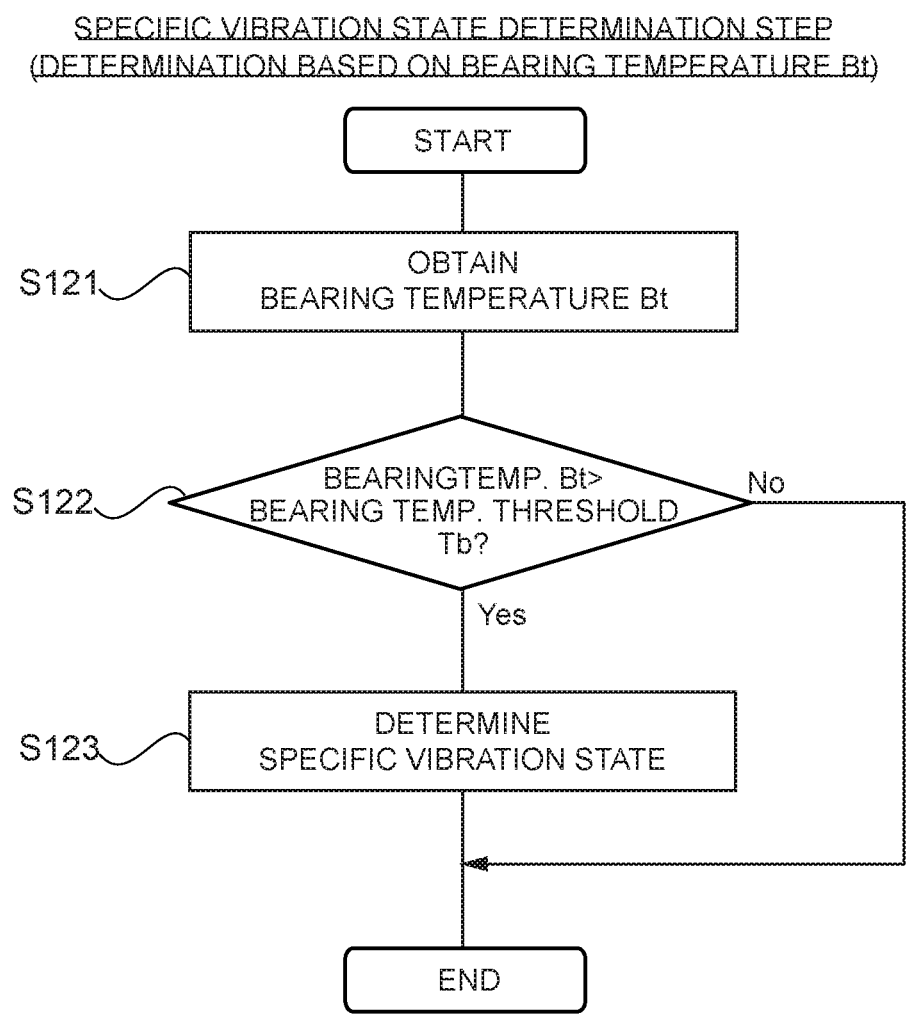
FIG. 12 is a flowchart showing in detail a specific-vibration-state determination step of a vibration suppression method for a turbocharger according to an embodiment of the present invention, which determines a specific vibration state on the basis of a bearing temperature.

FIGS. 11 and 12 are diagrams for describing an embodiment of determining the specific vibration state on the basis of the bearing temperature Bt of a bearing 17 supporting the rotor shaft 15 of the turbocharger 1. FIG. 11 is a configuration diagram of the vibration suppression apparatus 6 for a turbocharger which determines the specific vibration state on the basis of the bearing temperature Bt, according to an embodiment of the present invention. FIG. 12 is a flowchart showing in detail the specific-vibration-state determination step (S51 in FIG. 5) of the vibration suppression method for a turbocharger according to an embodiment of the present invention, which determines the specific vibration state on the basis of the bearing temperature Bt.

Figure 13:
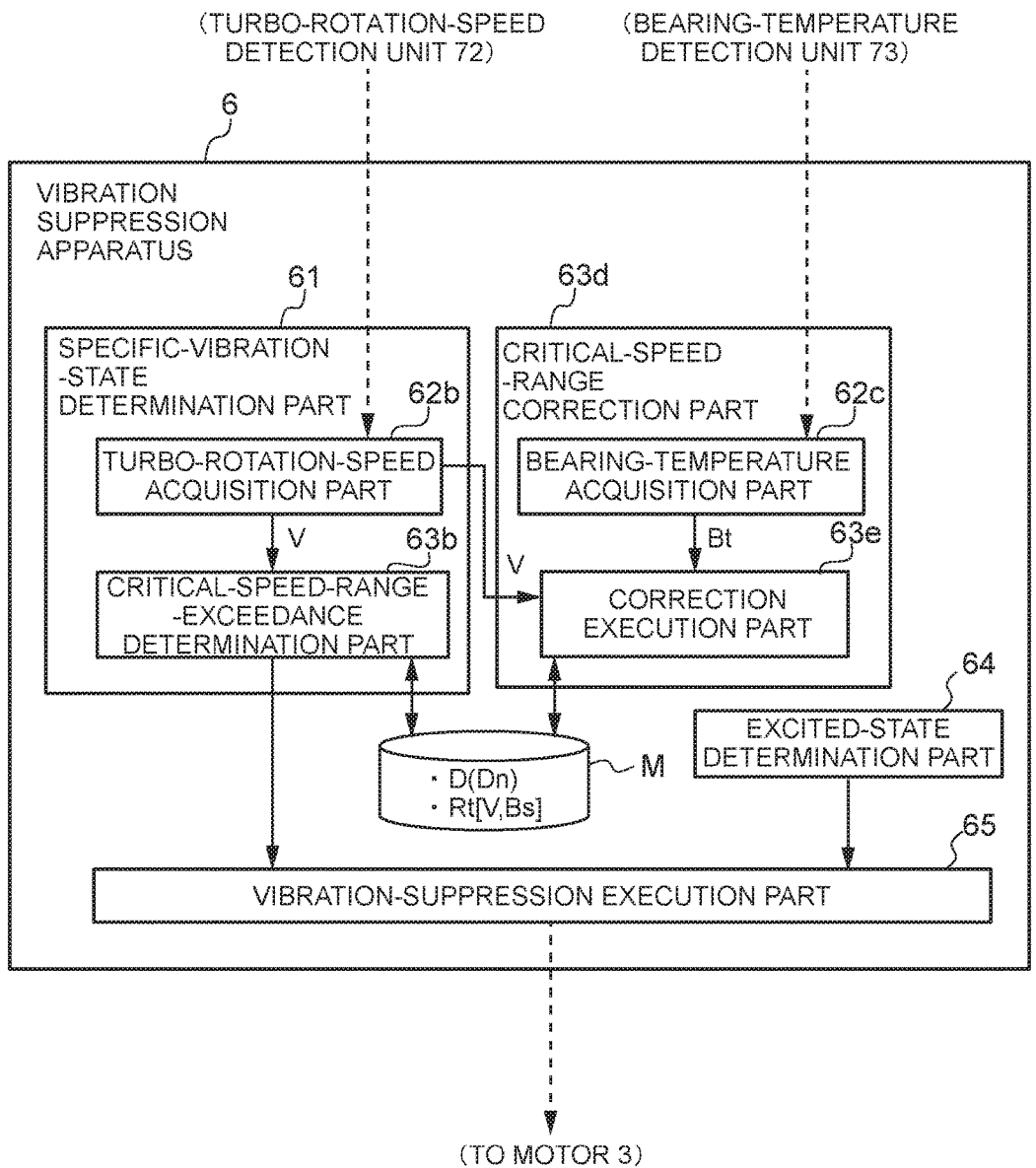
FIG. 13 is a configuration diagram of a vibration suppression apparatus for a turbocharger which includes a critical-speed-range correction part, according to an embodiment of the present invention.
Figure 14:
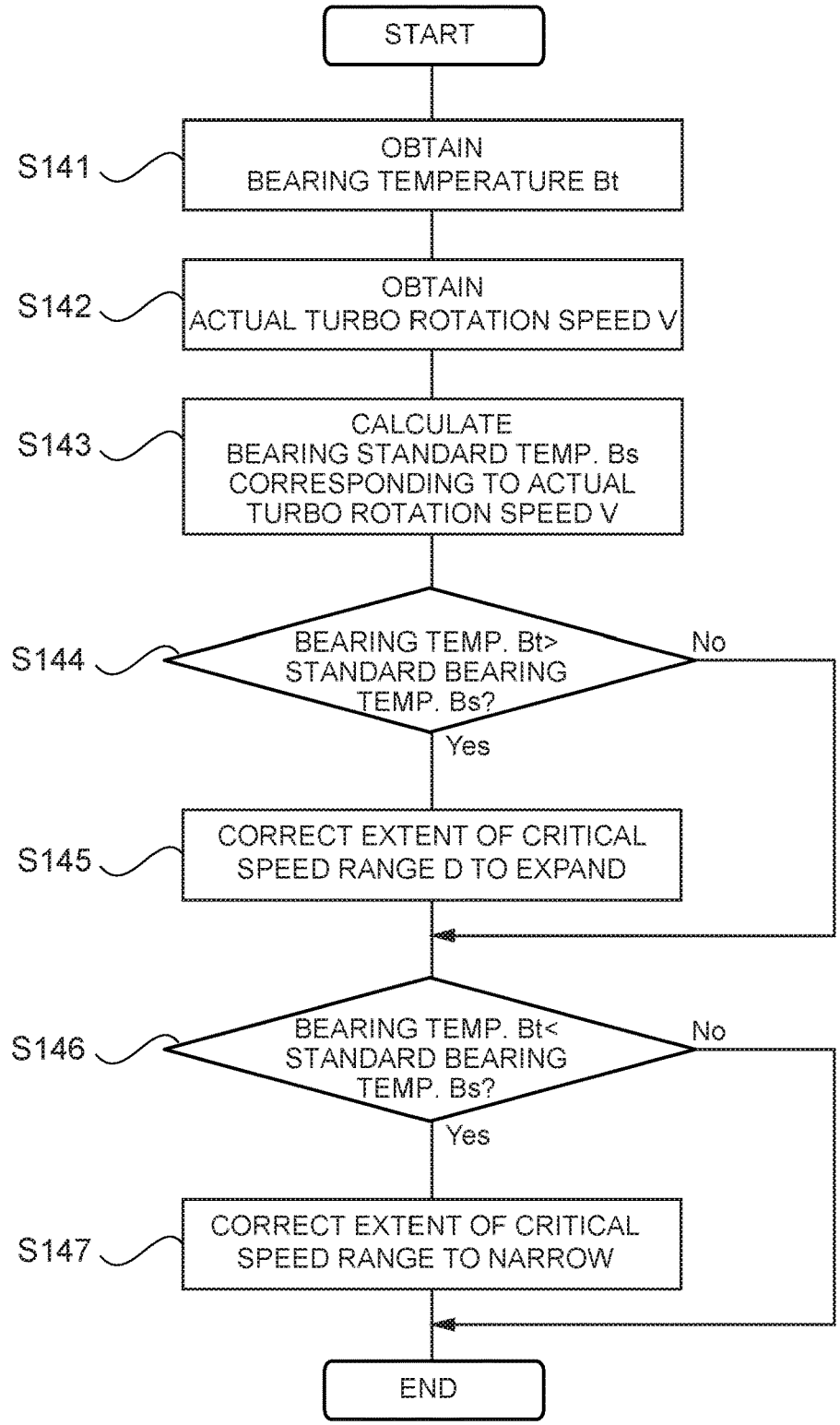
FIG. 14 is a flowchart showing a critical-speed range correction step, according to an embodiment of the present invention.
Figure 15:
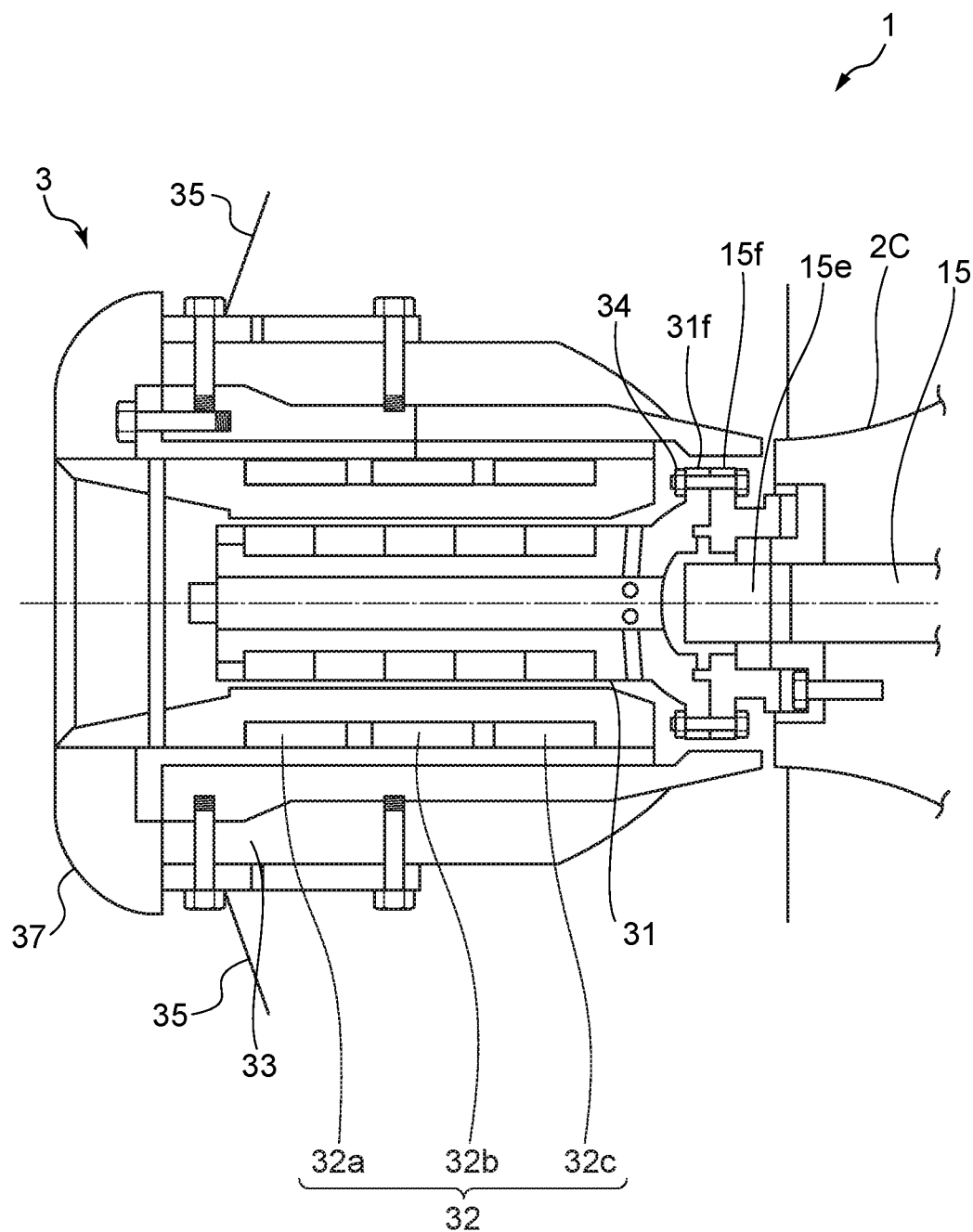
FIG. 15 is a diagram showing a motor having a plurality of elemental stators according to an embodiment of the present invention.
Figure 16:
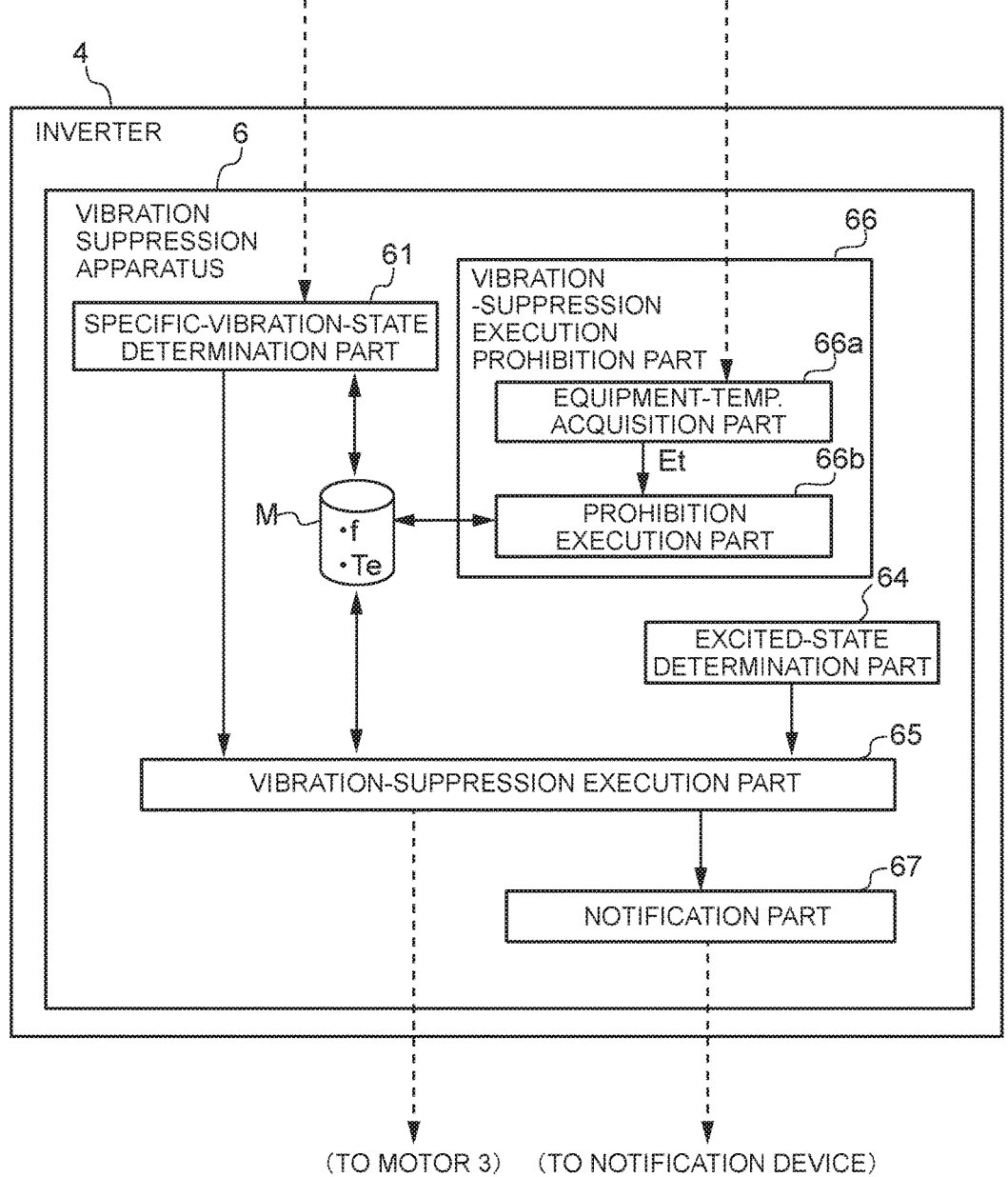
FIG. 16 is a configuration diagram of a vibration suppression apparatus for a turbocharger which includes a vibration suppression execution prohibition part and a notification part, according to an embodiment of the present invention.
Figure 17:
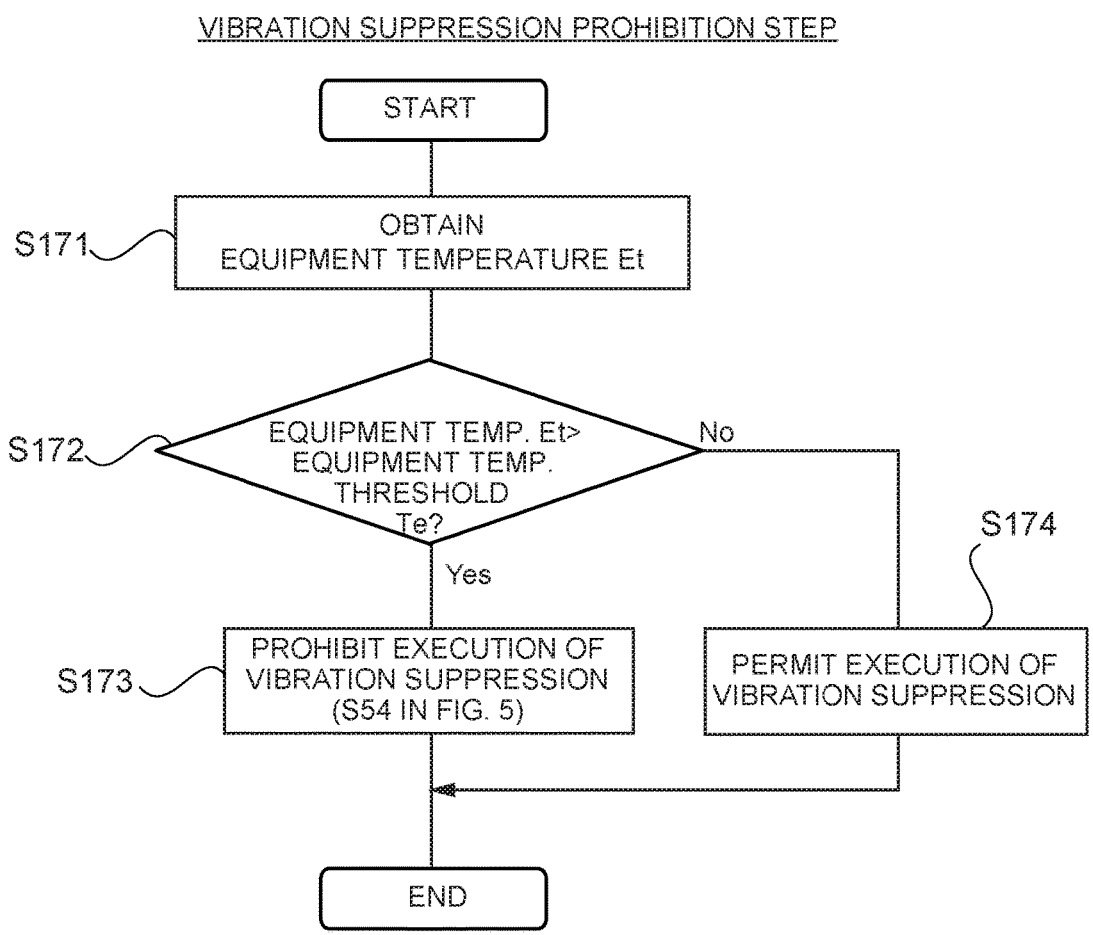
FIG. 17 is a flowchart showing a vibration suppression execution prohibition step, according to an embodiment of the present invention.
Figure 18:
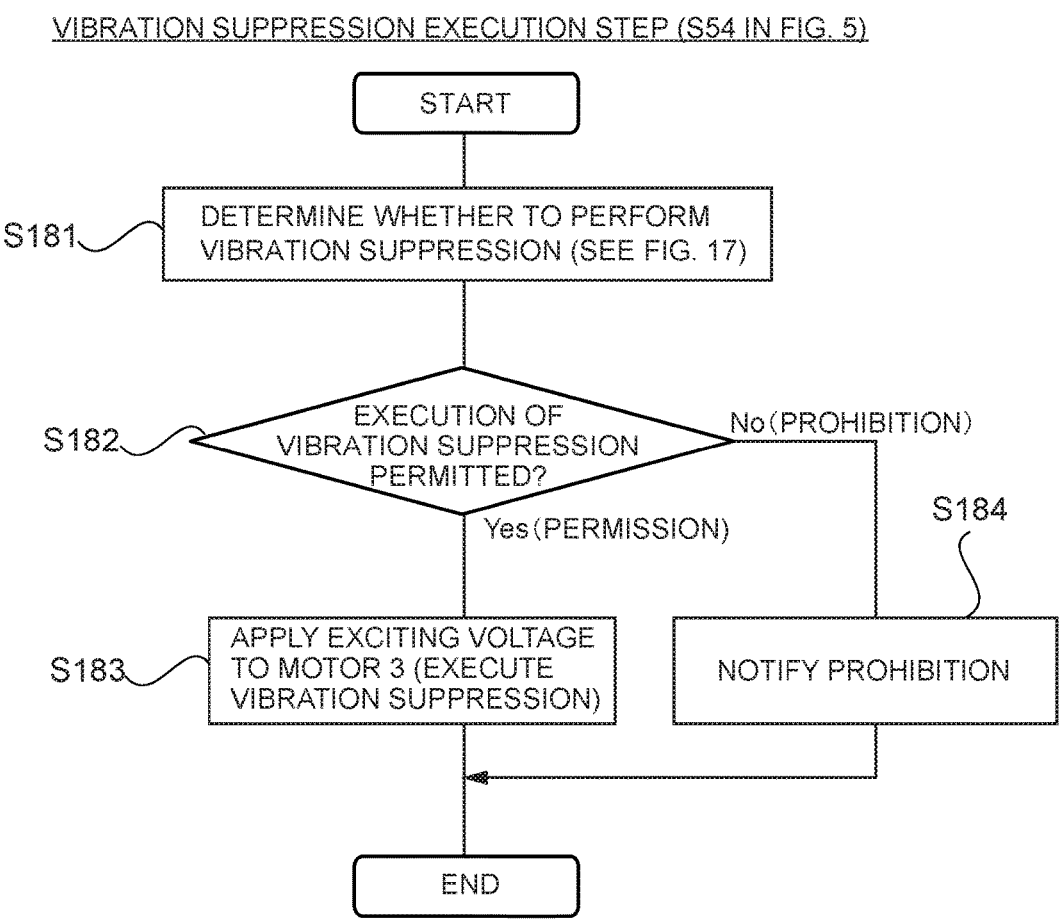
FIG. 18 is a flowchart showing a vibration suppression execution step, according to an embodiment of the present invention, performed with FIG. 17 in combination.

FIG. 13 is a configuration diagram of the vibration suppression apparatus 6 for a turbocharger, including a critical-speed-range correction part 63d, according to an embodiment of the present invention. FIG. 14 is a flowchart showing a critical-speed range correction step, according to an embodiment of the present invention. FIG. 15 is a diagram showing the motor 3 having a plurality of elemental stators according to an embodiment of the present invention. FIG. 16 is a configuration diagram of the vibration suppression apparatus 6 for a turbocharger which includes a vibration-suppression execution prohibition part 66 and a notification part 67, according to an embodiment of the present invention. FIG. 17 is a flowchart showing a vibration suppression execution prohibition step, according to an embodiment of the present invention. FIG. 18 is a flowchart showing a vibration suppression execution step, according to an embodiment of the present invention, performed with FIG. 17 in combination.

In some embodiments, as shown in FIG. 6, the specific-vibration-state determination part 61 includes a vibration detection value acquisition part 62a configured to obtain a vibration detection value F of shaft vibration of the rotor shaft 15 of the turbocharger 1, and a vibration determination part 63a configured to determine that the rotor shaft 15 is in the specific vibration state in which the magnitude of shaft vibration of the rotor shaft 15 is greater than a predetermined magnitude if the vibration detection value F obtained by the vibration detection value acquisition part 62a is greater than a predetermined vibration threshold Tf. As depicted in FIG. 6, the turbocharger 1 includes a vibration detection unit 71 capable of detecting shaft vibration. The vibration detection unit 71 is connected to the vibration detection value acquisition part 62a, and is configured such that a vibration detection value F detected by the vibration detection unit 71 is input to the vibration detection value acquisition part 62a. Accordingly, the vibration detection value acquisition part 62a can obtain the vibration detection value F of the rotor shaft 15. The vibration detection unit 71 may be a pickup device capable of converting vibration or velocity into an electric current corresponding to the magnitude of the vibration or the velocity.

In the embodiment depicted in FIG. 6, the vibration detection unit 71 is disposed on the bearing mount 13, and detects the bearing mount velocity Fs (mm/s) as the vibration detection value F. The vibration determination part 63a determines that the rotor shaft 15 is in the specific vibration state if the bearing mount velocity Fs is greater than the vibration threshold Tf which is a predetermined bearing mount velocity (Tf<Fs). However, the vibration detection value is not limited this, and any physical amount that can be detected as shaft vibration may be detected by the vibration detection unit 71. For instance, in some embodiments, the vibration detection unit 71 may detect the magnitude of shaft vibration (vibration level Fi($\mu$)) as the vibration detection value F, and determine that the rotor shaft 15 is in the specific vibration state if the vibration level Fi is greater than the vibration threshold Tf which is a predetermined vibration level (Tf<Fi).

With reference to FIG. 7, the vibration suppression method corresponding to the above described embodiment (see FIG. 6) now will be described. FIG. 7 is a detailed flowchart corresponding to the specific-vibration-state determination step S51 in FIG. 5. In some embodiments, as shown in FIG. 7, the specific-vibration-state determination step (S51 in FIG. 5) includes a vibration acquisition step (S71) of obtaining a vibration detection value F of shaft vibration of the rotor shaft 15, and a vibration determination step (S72 to S73) of determining that the rotor shaft 15 is in the specific vibration state in which the magnitude of shaft vibration of the rotor shaft 15 is greater than a predetermined magnitude if the vibration detection value F obtained in the vibration acquisition step (S71) is greater than a predetermined vibration threshold Tf. Referring to the flow of FIG. 7, in step S71, the vibration detection value F of the rotor shaft 15 is obtained by, for instance, obtaining the vibration detection value F from the vibration detection unit 71. For instance, as described above, the vibration detection unit 71 may detect the bearing mount velocity Fs or the vibration level Fi. In step S72, the vibration detection value F and the vibration threshold Tf are compared, and if it is determined that the vibration detection value F is greater than the vibration threshold Tf (Tf<F), it is determined that the rotor shaft 15 is in the specific vibration state in step S73. In contrast, if it is determined that the vibration detection value F is not greater than the vibration threshold Tf (Tf≥F) in step S72, the flow of FIG. 7 is terminated without performing step S73. Terminating the flow of FIG. 7 is the same as terminating step S51 of FIG. 5 described above, which means that the suppression vibration method proceeds continuously from step 52 in FIG. 5.

With the above configuration, as shown in FIGS. 6 and 7, it is possible to determine whether the magnitude of shaft vibration of the rotor shaft 15 is greater than a predetermined magnitude (whether the rotor shaft is in the specific vibration state), on the basis of the vibration detection value F obtained by directly detecting the shaft vibration of the rotor shaft 15.

In some other embodiments, as shown in FIG. 8 (the same applies to FIG. 13 described below), the specific-vibration-state determination part 61 includes an actual turbo rotation speed acquisition part 62b configured to obtain an actual turbo rotation speed V of the rotor shaft 15 of the turbocharger 1, and a critical speed range exceedance determination part 63b configured to determine that the rotor shaft 15 is in the specific vibration state in which the magnitude of shaft vibration of the rotor shaft 15 is likely to be greater than a predetermined magnitude, if the actual turbo rotation speed V obtained by the actual turbo rotation speed acquisition part 62b is in the critical speed range D of the rotor shaft 15. As depicted in FIG. 8, the turbocharger 1 includes an actual turbo rotation speed detection unit 72 capable of detecting an actual turbo rotation speed V which is a rotation speed of the rotor shaft 15 during operation. The actual turbo rotation speed detection unit 72 is connected to the actual turbo rotation speed acquisition part 62b, and is configured such that an actual turbo rotation speed V detected by the actual turbo rotation speed detection unit 72 is input to the actual turbo rotation speed acquisition part 62b. Accordingly, the actual turbo rotation speed acquisition part 62b can obtain the actual turbo rotation speed V. The actual turbo rotation speed detection unit 72 may be a rotation-speed sensor. In the embodiment depicted in FIG. 8, the actual turbo rotation speed detection unit 72 is supported on the air guide casing 14 of the turbocharger 1 while facing shroud-side edge portions of the blades 2Ta of the compressor wheel 2C.

Further, the critical speed range D of the rotor shaft 15 is a speed range in which the rotor shaft 15 may break apart from warp upon rotation. If the rotation speed of the rotor shaft 15 is in the critical speed range D, shaft vibration becomes harder. Accordingly, the critical speed range exceedance determination part 63b determines that the rotor shaft 15 is in the specific vibration state, for the magnitude of shaft vibration of the rotor shaft 15 is likely to be greater than a predetermined magnitude, if the rotation speed of the rotor shaft 15 is in the critical speed range D. More specifically, as depicted in FIG. 9, there is normally a plurality of critical speed ranges D, named as follows in the ascending order of the rotation speed of the rotor shaft 15: the first critical speed range D1, the second critical speed range D2, the third critical speed range D3, the fourth critical speed range D4, and so on. The n-th critical speed range Dn (n=1, 2, 3, 4, ... ) is one of the plurality of critical speed ranges D, and is defined by a lower limit value Dd and an upper limit value Du. If the rotation speed of the rotor shaft 15 is in the first critical speed range D1, the primary vibration mode (a) in FIG. 9 occurs. Similarly, when the rotation speed of the rotor shaft 15 is in the second critical speed range D2, in the third critical speed range D3, or in the fourth critical speed range D4, the secondary vibration mode (b) in FIG. 9, the tertiary vibration mode (c) in FIG. 9, or the quartic vibration mode (d) in FIG. 9 occur, respectively. The upper limit value Du of the n-th critical speed range Dn is smaller than the lower limit value Dd of the n+1-th critical speed range Dn+1.

The vibration suppression method corresponding to the above described embodiment (see FIG. 8) will be described with reference to FIG. 10. FIG.10 is a detailed flowchart corresponding to the specific-vibration-state determination step S51 in FIG. 5. In some embodiments, as shown in FIG. 10, the specific-vibration-state determination step (S51 in FIG. 5) includes an actual turbo rotation speed acquisition step (S101) of obtaining an actual turbo rotation speed V of the rotor shaft 15 of the turbocharger 1, and a critical speed range exceedance determination step (S102 to S103) of determining that the rotor shaft 15 is in the specific vibration state in which the magnitude of shaft vibration of the rotor shaft 15 is likely to be greater than a predetermined magnitude if the actual turbo rotation speed V obtained by the actual turbo rotation speed acquisition part 62b is in the critical speed range D of the rotor shaft 15. Referring to the flow of FIG. 10, in step S101, the actual turbo rotation speed V of the rotor shaft 15 is obtained by, for instance, obtaining the actual turbo rotation speed V from the actual turbo rotation speed detection unit 72. In step S102, the actual turbo rotation speed V and the critical speed ranges D are compared, and if it is determined that the actual turbo rotation speed V is in one of the critical speed ranges D (Dd≤V≤Du), it is determined that the rotor shaft 15 is in the specific vibration state in step S103. In contrast, if it is determined that the vibration detection value F of shaft vibration is not in the critical speed ranges D (Dd>V, Du<V) in step S102, the flow of FIG. 10 is terminated without performing step S103.

Upon determination in step S102 of whether the actual turbo rotation speed V is in the critical speed ranges D, it is determined that the actual turbo rotation speed V is not in the critical speed ranges D if it is determined that the actual turbo rotation speed V is not in any of the critical speed ranges D (the n-th critical ranges Dn). Terminating the flow of FIG. 7 is the same as terminating step S51 of FIG. 5 described above, which means that the suppression vibration method proceeds continuously from step 52 in FIG. 5.

With the above configuration, as shown in FIGS. 8 to 10, it is possible to determine whether there is a possibility that the magnitude of shaft vibration of the rotor shaft 15 is greater than a predetermined magnitude (whether the rotor shaft is in the specific vibration state), on the basis of the rotation speed (actual turbo rotation speed V) of the rotor shaft.

In some other embodiments, as shown in FIG. 11, the specific-vibration-state determination part 61 includes a bearing-temperature acquisition part 62c configured to obtain a bearing temperature Bt of a bearing 17 of the rotor shaft 15, and a bearing temperature determination part 63c configured to determine that the rotor shaft 15 is in the specific vibration state in which the magnitude of shaft vibration of the rotor shaft 15 is likely to be greater than a predetermined magnitude if the bearing temperature Bt obtained by the bearing-temperature acquisition part 62c is greater than a predetermined bearing temperature threshold Tb. As depicted in FIG. 11, with the rotor shaft 15 of the turbocharger 1 supported by the bearings 17 (17s, 17a, 17b), the temperature of the bearings 17 (bearing temperature Bt) tends to increase with an increase in shaft vibration of the rotor shaft 15, due to friction heat or the like. Particularly in the above described critical speed ranges D, rotation of the rotor shaft 15 on the bearings 17 associated with strong vibration leads to a decrease in the thickness of oil film of lubricant oil, which increases the temperature of metal forming the bearings 17 (metal temperature) and the temperature of lubricant oil. Utilizing this phenomenon, the bearing temperature determination part 63c is configured to determine whether the rotor shaft 15 is in the specific vibration state on the basis of the bearing temperature Bt. Thus, the turbocharger 1 includes a bearing-temperature detection unit 73 (e.g. thermometer) capable of detecting the bearing temperature Bt. The bearing-temperature detection unit 73 is connected to the bearing-temperature acquisition part 62c, and is configured such that a bearing temperature Bt detected by the bearing-temperature detection unit 73 is input to the bearing-temperature acquisition part 62c. Accordingly, the bearing-temperature acquisition part 62c can obtain the bearing temperature Bt.

In the embodiment depicted in FIG. 11, the bearing-temperature detection unit 73 is disposed on the radial bearing 17a on the compressor side, which tends to vibrate stronger than the radial bearing 17b on the turbine side (see FIG. 9). Further, the bearing-temperature detection unit 73 detects the metal temperature of the radial bearing 17a as the bearing temperature Bt. The position of the bearing-temperature detection unit 73 is not limited this, and in some other embodiments, the bearing-temperature detection unit 73 may be disposed on the radial bearing 17b on the turbine side or on the thrust bearing 17t. Further, the bearing-temperature detection unit 73 may be disposed on at least one of the bearings 17 (17a, 17b, 17t). In some other embodiments, the bearing-temperature detection unit 73 may be configured to be capable of detecting an oil temperature of lubricant oil supplied to the bearings 17, thus detecting the oil temperature of lubricant oil as the bearing temperature Bt.

The vibration suppression method corresponding to the above described embodiment (see FIG. 11) will be described with reference to FIG. 12. FIG.12 corresponds to the specific-vibration-state determination step S51 in FIG. 5. In some other embodiments, as shown in FIG. 12, the specific-vibration-state determination step (S51 in FIG. 5) includes a bearing temperature acquisition step (S121) of obtaining a bearing temperature Bt of a bearing 17 of the rotor shaft 15, and a bearing temperature determination step (S122 to S123) of determining that the rotor shaft 15 is in the specific vibration state in which the magnitude of shaft vibration of the rotor shaft 15 is likely to be greater than a predetermined magnitude, if the bearing temperature Bt obtained by the bearing-temperature acquisition part 62c is greater than a predetermined bearing temperature Tb. Referring to the flow of FIG. 12, in step S121, the bearing temperature Bt is obtained by, for instance, obtaining the bearing temperature Bt from the bearing-temperature detection unit 73. For instance, as described above, the bearing-temperature detection unit 73 may detect the metal temperature or the lubricant oil temperature of a bearing 17. In step S122, the bearing temperature Bt and the bearing temperature threshold Tb are compared, and if it is determined that the bearing temperature Bt is greater than the bearing temperature threshold Tb (Tb<Bt), it is determined that the rotor shaft 15 is in the specific vibration state in step S123. In contrast, if it is determined that the bearing temperature Bt is not greater than the bearing temperature threshold Tb in step S122 (Tb≥Bt), the flow of FIG. 12 is terminated without performing step S123. Terminating the flow of FIG. 12 is the same as terminating step S51 of FIG. 5 described above, which means that the suppression vibration method proceeds continuously from step 52 in FIG. 5.

With the above configuration, it is possible to determine whether there is a possibility that the magnitude of shaft vibration of the rotor shaft 15 is greater than a predetermined magnitude (whether the rotor shaft 15 is in the specific vibration state), on the basis of the bearing temperature Bt of a bearing 17 supporting the rotor shaft 15.

Further, in some embodiments, the critical speed ranges D in the above described embodiment (see FIGS. 8 to 10) of determining the specific vibration state on the basis of the actual turbo rotation speed V may be corrected on the basis of the above described bearing temperature Bt of the bearing 17. Specifically, as depicted in FIG. 13, the vibration suppression apparatus 6 further includes a critical-speed-range correction part 63d to correct the extent of the critical speed ranges D. The critical-speed-range correction part 63d includes a bearing-temperature acquisition part 62c to obtain the bearing temperature Bt of a bearing of the rotor shaft 15, and a correction execution part 63e to correct the extent of the critical speed ranges D on the basis of the bearing temperature Bt obtained by the bearing-temperature acquisition part 62c. As described above, the bearing-temperature acquisition part 62c obtains the bearing temperature Bt from the bearing-temperature detection unit 73.

Further, the critical-speed-range correction part 63d has information on the standard bearing temperature Bt in relation to the actual turbo rotation speed V (bearing standard temperature information Rt), whereby a bearing standard temperature Bs can be calculated from an actual turbo rotation speed V on the basis of the bearing standard temperature information Rt. If the bearing temperature Bt is higher than the bearing standard temperature Bs (Bt>Bs), it suggests a possibility that shaft vibration is stronger than assumption (standard). Thus, the extent of the critical speed ranges D (Dn) is increased by performing at least one of: increasing the upper limit value Du of the critical speed ranges D (Dn); or reducing the lower limit value Dd, in accordance with the gap therebetween (Bt minus Bs), for instance. Accordingly, it is more likely to be determined that the actual turbo rotation speed V is in the critical speed ranges D even for the same actual turbo rotation speed V, and thus it is possible to avoid a failure to perform vibration suppression when shaft vibration is actually stronger than assumption, in accordance with an operational condition. In contrast, if the bearing temperature Bt is lower than the bearing standard temperature Bs (Bt<Bs), it suggests a possibility that shaft vibration is weaker than assumption (standard). Thus, the extent of the critical speed ranges D (Dn) is reduced by performing at least one of: reducing the upper limit value Du of the critical speed ranges D (Dn); or increasing the lower limit value Dd, in accordance with the gap therebetween (Bs minus Bt), for instance. Accordingly, it is less likely to be determined that the actual turbo rotation speed V is in the critical speed ranges D even for the same actual turbo rotation speed V, and thus it is possible to avoid execution of vibration suppression when shaft vibration is actually weaker than assumption, in accordance with an operational condition. Upon correction of the critical speed ranges D (Dn), a part of the critical speed ranges D may be corrected, or all of the critical speed ranges D may be corrected. For instance, the critical speed range D closest to the actual turbo rotation speed V or the critical speed ranges D next to (higher and lower) the actual turbo rotation speed V may be corrected, from among the plurality of critical speed ranges D (n-th critical speed range Dn).

In the embodiment depicted in FIG. 13, the actual turbo rotation speed acquisition part 62d and the bearing-temperature acquisition part 62c are each connected to the correction execution part 63e, and the actual turbo rotation speed V and the bearing temperature Bt are input to the correction execution part 63e from the respective functional parts of the actual turbo rotation speed acquisition part 62d and the bearing-temperature acquisition part 62c. When receiving the above inputs, the correction execution part 63e obtains a bearing standard temperature Bs corresponding to the actual turbo rotation speed V by using the bearing standard temperature information Rt in the memory M. The correction execution part 63e compares the detected bearing temperature Bt and the bearing standard temperature Bs, determines whether the detected bearing temperature Bt is greater or smaller than the bearing standard temperature Bs, and corrects the extent of the critical speed ranges D in accordance with the difference as described above. Specifically, the critical-speed-range correction part 63d may directly correct the critical speed ranges D (Dn) stored in the memory M of the vibration suppression apparatus 6. The specific-vibration-state determination part 61 depicted in FIG. 13 is already described and not described again.

The vibration suppression method corresponding to the above described embodiment (see FIG. 13) will be described with reference to FIG. 14. In some embodiments, as depicted in FIG. 14, the vibration suppression method further includes a critical speed range correction step (S140) of correcting the extent of the critical speed ranges D. The critical speed range correction step includes a bearing temperature acquisition step (S141) of obtaining the bearing temperature Bt of a bearing 17 of the rotor shaft 15, and a correction execution step (142 to S147) of correcting the extent of the critical speed ranges D on the basis of the bearing temperature Bt obtained by the bearing-temperature acquisition part 62c. Referring to the flow of FIG. 14, in step S141, the bearing temperature Bt is obtained by, for instance, obtaining the bearing temperature Bt from the bearing-temperature detection unit 73. In step S142, the actual turbo rotation speed V is obtained by, for instance, obtaining the actual turbo rotation speed V from the actual turbo rotation speed detection unit 72. Further, in step S143, the bearing standard temperature Bs corresponding to the obtained actual turbo rotation speed V is calculated by referring to the above bearing standard temperature information Rt, for instance.

Further, in step S144, the bearing temperature Bt and the bearing standard temperature Bs are compared with, and if the bearing temperature Bt is greater than the bearing standard temperature Bs (Bt>Bs), the extent of the critical speed ranges D (Dn) is corrected in step S145 as described above, in accordance with the gap there between (Bt minus Bs), so that the extent expands. In contrast, if the bearing temperature Bt is not greater than the bearing standard temperature Bs (Bt≤Bs) in step S144, the process advances to the next step S146 without performing step S145. Further, in step S146, the bearing temperature Bt and the bearing standard temperature Bs are compared with, and if the bearing temperature Bt is smaller than the bearing standard temperature Bs (Bt<Bs), the extent of the critical speed ranges D (Dn) is corrected in S147 as described above, in accordance with the gap there between (Bs minus Bt), so that the extent narrows. In contrast, if the bearing temperature Bt is not smaller than the bearing standard temperature Bs (Bt≥Bs) in step S146, the flow of FIG. 14 is terminated without performing step S147.

With the above configuration, for instance, the critical speed ranges D are corrected on the basis of the bearing temperature Bt obtained on the basis of the lubricant oil temperature or the metal temperature of a bearing 17. Accordingly, upon determination of the specific vibration state of whether the magnitude of shaft vibration is likely to be greater than a predetermined magnitude on the basis of the actual turbo rotation speed V, it is possible to take account of the actual operational condition of the turbocharger 1, and thus it is possible to determine the specific vibration state on the basis of the actual turbo rotation speed V more accurately.

Next, other features of the vibration suppression apparatus 6 or the vibration suppression method will be described.

In some embodiments, as described above, the motor 3 includes the stator 32 disposed so as to surround the rotor shaft 15. Further, as depicted in FIG. 15, the stator 32 includes a plurality of elemental stators (in FIG. 15, three elemental stators 32a to 32c) disposed in series along the rotor shaft 15. The vibration-suppression execution part 65 of the vibration suppression apparatus 6 or the vibration-suppression execution step (S54 in FIG. 5) of the vibration suppression method may apply an exciting voltage to a target elemental stator 32t which comprises at least one elemental stator assigned for each of the vibration modes of the rotor shaft 15. In other words, the stator 32 of the motor 3 is configured such that it is possible to apply an exciting voltage independently and separately to each of the plurality of elemental stators. In the embodiment depicted in FIG. 15, the stator 32 of the motor 3 is divided into three elemental stators (32a to 32c) along the axial direction of the rotor shaft 15. However, the number of elemental stators making up the stator 32 is not limited to this, and may be any number that is two or more.

Further, the vibration suppression apparatus 6 has target elemental stator information on at least one elemental stator selected from the plurality of elemental stators in association with each of the plurality of vibration modes (see FIG. 9) that occurs with the rotor shaft 15. In other words, the target elemental stator information contains information on at least one elemental stator associated with each of the plurality of vibration modes, or each of the plurality of critical speed ranges D (n-th critical speed range Dn). Further, upon execution of vibration suppression, the vibration-suppression execution part 65 determines the vibration mode on the basis of comparison between the actual turbo rotation speed V and the critical speed ranges D (Dn), for instance, and determines the at least one target elemental stator 32t for applying an exciting voltage on the basis of the determined vibration mode by referring to the above target elemental stator information. If the target elemental stator 32t does not include all of the elemental stators, power consumption can be cut compared with a case of applying an exciting voltage to all the elemental stators.

For instance, in some embodiments, the target elemental stator 32t may be determined on the basis of the magnitude of the amplitude of the vibration mode of the rotor shaft 15. The greater the amplitude of shaft vibration is, the stronger the motor rotor 31 needs to be attracted to the stator 32. Thus, more elemental stators may be included in the target elemental stator.

In some other embodiments, elemental stators to be included in the target elemental stator 32t in each vibration mode may be determined limitedly from among elemental stators disposed in the vicinity of a position where the amplitude becomes greater in each vibration mode.

Specifically, for the rotor shaft 15 (the motor 3 and the rotor shaft 15) that vibrates as depicted in FIG. 9, for instance, shaft vibration of the rotor shaft 15 is relatively strong at all the positions in the primary vibration mode shown in (a) of FIG. 9 and thus all the elemental stators may be determined to be the target elemental stator 32t, while the first elemental stator 32a and the second elemental stator 32b may be determined to be the target elemental stators 32t in the secondary to quartic vibration modes shown in (b) to (d) of FIG. 9. In this case, in the embodiment depicted in FIG. 15, an exciting voltage is not applied to the third elemental stator 32c in the secondary to quartic vibration modes, and thereby it is possible to save on power consumption accordingly.

With the above configuration, the stator 32 of the motor 3 includes a plurality of elemental stators (in FIG. 15, three elemental stators 32a, 32b, 32c) disposed along the axial direction of the rotor shaft 15. The rotor shaft 15 vibrates at different amplitudes and positions depending on the vibration modes (e.g. the primary, secondary, tertiary vibration mode). Thus, instead of applying an exciting voltage to all of the elemental stators upon execution of vibration suppression, an exciting voltage is applied to limited elemental stators (target elemental stator 32t) alone, by limiting to at least a part of the plurality of elemental stators in accordance with the magnitude of vibration, or by limiting to elemental stators disposed on a section where the amplitude becomes large in each vibration mode. Accordingly, it is possible to cut power consumption compared with a case in which an exciting voltage is applied to all of the elemental stators, which makes it possible to suppress vibration of the rotor shaft 15 while saving power.

Further, in the embodiment described with reference to FIG. 15, in some other embodiments, the target elemental stator 32t corresponding to the respective vibration modes may include the elemental stator closest to the compressor-side end portion of the rotor shaft 15. In the embodiment depicted in FIG. 15, it is the first elemental stator 32a.

With the above configuration, the elemental stator closest to the compressor-side end portion of the rotor shaft 15 (in FIG. 15, the first elemental stator 32a) is always included in the target elemental stator 32t regardless of the type (the order n) of vibration mode. Herein, the present inventors focused on that the amplitude tends to be the greatest at the compressor-side end portion of the rotor shaft 15, in any of the vibration modes. As described above, it is possible to suppress vibration of the rotor shaft 15 more efficiently by including the elemental stator closest to the compressor-side end portion of the rotor shaft 15 in the target elemental stator 32t, regardless of the type (order) of the vibration mode.

Further, in some embodiments, as depicted in FIG. 16, in each of the above embodiments, the vibration suppression apparatus 6 may further include a vibration-suppression execution prohibition part 66 for prohibiting execution of the vibration-suppression execution part 65. The vibration-suppression execution prohibition part 66 includes an equipment temperature acquisition part 66a configured to obtain an equipment temperature Et of equipment including at least one of the motor 3 of the turbocharger 1 or the inverter 4 for driving the motor 3, and a prohibition execution part 66b configured to prohibit execution of the vibration-suppression execution part 65 if the equipment temperature is at a predetermined equipment temperature threshold Te or higher. The equipment temperature acquisition part 66a is connected to an equipment-temperature detection unit 74 capable of detecting the equipment temperature Et, and is configured to receive inputs of the equipment temperature Et from the equipment-temperature detection unit 74. Further, for instance, the prohibition execution part 66b is configured to be capable of updating an execution permission flag f that indicates permission or prohibition of execution of vibration suppression stored in the memory M of the vibration suppression apparatus 6, whereby the prohibition execution part 66b permits or forbids application of an exciting voltage to the motor 3 (execution of vibration suppression) by the vibration-suppression execution part 65. In this case, the vibration-suppression execution part 65 confirms the execution permission flag f in the memory M, and determines whether to permit execution of vibration suppression in accordance with information of the execution permission flag f (see FIG. 18 described below).

The vibration suppression method corresponding to the above described embodiment (see FIG. 16) will be described with reference to FIG. 17. In some embodiments, as depicted in FIG. 17, the vibration suppression method may further include a vibration suppression execution prohibition step (S171 to S173) of prohibiting execution of the vibration-suppression execution step (step S54 in FIG. 5). Specifically, the vibration suppression execution prohibition step (S171 to S174) includes an equipment temperature acquisition step (S171) of obtaining an equipment temperature Et of equipment including at least one of the motor 3 of the turbocharger 1 or the inverter 4 for driving the motor 3, and a prohibition execution step (S172 to S173) of prohibiting execution of the vibration-suppression execution step (step S54 in FIG. 5) if the equipment temperature is at a predetermined equipment temperature threshold Te or higher. Referring to the flow of FIG. 17, in step S171, the equipment temperature Et is obtained by, for instance, obtaining the equipment temperature Et from the equipment-temperature detection unit 74. Further, in step S172, the equipment temperature Et and the equipment temperature threshold Te are compared with, and if the equipment temperature Et is greater than the equipment temperature threshold Te (Td>Te), the above described execution permission flag f is updated to prohibition in step S173, and thereby execution of the vibration suppression execution step (S54 in FIG. 5) is prohibited. In contrast, if the equipment temperature Et is not greater than the equipment temperature threshold Te (Td≤Te) in step S172, the flow of FIG. 17 is terminated without performing step S173. In the embodiment depicted in FIG. 17, if step S172 is NO (Td≤Te), the above described execution permission flag f is set to permission to permit execution of vibration suppression in step S174, and then the flow of FIG. 17 is terminated.

Further, in the present embodiment, the vibration suppression execution step S54 in FIG. 5 is replaced with a flow as depicted in FIG. 18. Referring to the flow of FIG. 18, in step S181, the execution permission flag f in the above described memory M that is set (updated) in the above described vibration suppression execution prohibition step (FIG. 17) is confirmed, and thereby whether to execute vibration suppression is determined. Further, if it is determined that execution of vibration suppression is permitted in step S182, vibration suppression is executed in step S183. That is, an exciting voltage is applied to the motor 3. In contrast, if it is determined that execution of vibration suppression is prohibited in step S182, the flow of FIG. 18 (FIG. 5) is terminated without performing step S183.

With the above configuration, execution of vibration suppression is prohibited if the equipment temperature Et is excessively high. Accordingly, it is possible to prevent further increase of the equipment temperature due to execution of vibration suppression, thus protecting the equipment.

Further, in some embodiments, as depicted in FIG. 16, the vibration suppression apparatus 6 may further include a notification part 67 for notifying execution by the vibration-suppression execution prohibition part 66. The notification part 67 is connected to a notification device of a display, sound, or light, and notification is made by outputting information to the notification device. At this time, other information such as change in the vibration detection value F, the actual turbo rotation speed V, the bearing temperature Bt, and the equipment temperature Et may be notified as well. Similarly, as depicted in FIG. 18, the vibration suppression method may further include a notification step (S184) for notifying execution of the vibration-suppression execution prohibition step (S184). In the embodiment depicted in FIG. 18, the notification step (S184) is executed before the flow of FIG. 18 ends, if it is determined that execution of vibration suppression is prohibited in step S182 of FIG. 18.

In the embodiment depicted in FIG. 16, the vibration suppression apparatus 6 includes the vibration-suppression execution prohibition part 66 and the notification part 67. Also, in the embodiment depicted in FIGS. 17 and 18, the vibration suppression method includes the vibration suppression execution prohibition step (S171 to S173) and the notification step (S184). However, the notification part 67 and the notification step (S184) are not requirements and may be omitted in some other embodiments. Furthermore, the critical-speed-range correction part 63d or the critical speed range correction step may be provided.

With the above configuration, it is possible to notify an outside party such as an operator and an exterior system about prohibition of execution of the vibration suppression execution step (S54 in FIG. 5). In other words, it is possible to inform an outside party that vibration (noise) of the electric-assisted turbocharger 1 cannot be suppressed.

Described above is the electric-assisted turbocharger 1 having a motor hung over structure according to an embodiment of the present invention, referring to a two-cycle diesel engine for ships as an example. The present invention is not limited thereto, and various amendments and modifications may be implemented.

For instance, in some other embodiments, the electric-assisted turbocharger 1 may be mounted to a four-cycle diesel engine for ships. Further, in some other embodiments, the electric-assisted turbocharger 1 may be mounted to an engine not for ships, but for automobiles, for instance.

Still further, the present invention can be applied to an electric-assisted turbocharger 1 that does not have the motor hung over structure. In this case, for instance, the electric-assisted turbocharger 1 may be disposed between the two radial bearings 17a, 17b, and the motor 3 depicted in FIGS. 1, 2, 6, 8, 11, and 15 may be positioned between the two radial bearings 17a, 17b.

DESCRIPTION OF REFERENCE NUMERALS

1 Turbocharger
11 Exhaust-inlet casing
12 Exhaust-outlet casing
13 Bearing mount
14 Air guide casing
15 Rotor shaft
15e Shaft extended portion
15f Flange
17 Bearing
17a Radial bearing (compressor side)
17b Radial bearing (turbine side)
17t Thrust bearing
2C Compressor wheel
2Ca Blade
2T Turbine wheel
2Ta Blade
22 Exhaust intake path
23 Exhaust discharge path
24 Intake-air guide path
25 Scroll chamber
26 Silencer
27 Intermediate piece
3 Motor
31 Motor rotor
31f Flange
32 Stator
32a First elemental stator
32b Second elemental stator
32t Target elemental stator
33 Housing
34 Bolt and nut
35 Support member
37 Cap
38 Bolt
4 Inverter
6 Vibration suppression apparatus
61 Specific-vibration-state determination part
62a Vibration-detection-value acquisition part
62b Actual-turbo-rotation-speed acquisition part
62c Bearing-temperature acquisition part
63a Vibration determination part
63b Critical-speed-range-exceedance determination part
63c Bearing-temperature determination part
63d Critical-speed-range correction part
63e Correction execution part
64 Excited-state determination part
65 Vibration-suppression execution part
66 Vibration-suppression execution prohibition part
66a Equipment-temperature acquisition part
66b Prohibition execution part
67 Notification part
M Memory
71 Vibration detection unit
72 Actual-turbo-rotation-speed detection unit
73 Bearing-temperature detection unit
74 Equipment-temperature detection unit
F Vibration detection value
Tf Vibration threshold
Fi Vibration level
Fs Bearing mount velocity
V Actual turbo rotation speed
D Critical speed range
Dd Lower limit value
Du Upper limit value
Dn n-th critical speed range
D1 First critical speed range
D2 Second critical speed range
D3 Third critical speed range
D4 Fourth critical speed range
Bt Bearing temperature
Tb Bearing temperature threshold
Rt Bearing standard temperature information
Bs Bearing standard temperature
Et Equipment temperature
Te Equipment temperature threshold
f Execution permission flag

The invention claimed is:

1. A method of suppressing shaft vibration of a turbocharger capable of being driven by a motor, the method comprising:
 a specific-vibration-state determination step of determining whether a rotor shaft of the turbocharger is in a specific vibration state in which a magnitude of shaft vibration of the rotor shaft is, or is likely to be, greater than a predetermined magnitude;

an excited state determination step of determining whether the motor is in an excited state in which the exciting voltage is applied to the motor; and a vibration suppression execution step of applying the exciting voltage to the motor if it is determined that the rotor shaft is in the specific-vibration-state in the specific-vibration-state determination step and it is determined that the motor is not in the excited state in the excited state in the excited state determination step, wherein the specific-vibration-state determination step includes:

an actual turbo rotation speed acquisition step of obtaining an actual turbo rotation speed of the rotor shaft and a critical speed range exceedance determination step of determining that the rotor shaft is in the specific vibration state in which the magnitude of the shaft vibration step of the rotor shaft is likely to be greater than the predetermined magnitude, if the actual turbo rotation speed obtained in the actual turbo rotation speed acquisition step is within a critical speed range of the rotor shaft, and wherein the method of suppressing shaft vibration of a turbocharger further comprises:

a critical speed range correction step of correcting an extent of the critical speed range, wherein the critical speed range correction step includes:

a bearing temperature acquisition step of obtaining a bearing temperature of a bearing of the rotor shaft; and a correction execution step of correcting the extent of the critical speed range on the basis of the bearing temperature obtained in the bearing temperature acquisition step.

2. The method of suppressing shaft vibration of a turbocharger according to claim 1, wherein the specific-vibration-state determination step includes:

a vibration acquisition step of obtaining a vibration detection value of the shaft vibration of the rotor shaft; and a vibration determination step of determining that the rotor shaft is in the specific vibration state in which the magnitude of the shaft vibration of the rotor shaft is greater than the predetermined magnitude, if the vibration detection value obtained in the vibration acquisition step is greater than a predetermined vibration threshold.

3. A method of suppressing shaft vibration of a turbocharger capable of being driven by a motor, the method comprising:

a specific-vibration-state determination step of determining whether a rotor shaft of the turbocharger is in a specific vibration state in which a magnitude of shaft vibration of the rotor shaft is, or is likely to be, greater than a predetermined magnitude;

an excited state determination step of determining whether the motor is in an excited state in which the exciting voltage is applied to the motor; and a vibration suppression execution step of applying the exciting voltage to the motor if it is determined that the rotor shaft is in the specific-vibration-state in the specific-vibration-state determination step and it is determined that the motor is not in the excited state in the excited state in the excited state determination step, wherein the specific-vibration-state determination step includes:

a bearing temperature acquisition step of obtaining a bearing temperature of a bearing of the rotor shaft; and a bearing temperature determination step of determining that the rotor shaft is in the specific vibration state in which the magnitude of the shaft vibration of the rotor shaft is likely to be greater than the predetermined magnitude, if the bearing temperature obtained in the bearing temperature acquisition step is greater than a predetermined bearing temperature threshold.

4. A method of suppressing shaft vibration of a turbocharger capable of being driven by a motor, the method comprising:

a specific-vibration-state determination step of determining whether a rotor shaft of the turbocharger is in a specific vibration state in which a magnitude of shaft vibration of the rotor shaft is, or is likely to be, greater than a predetermined magnitude;

an excited state determination step of determining whether the motor is in an excited state in which the exciting voltage is applied to the motor; and a vibration suppression execution step of applying the exciting voltage to the motor if it is determined that the rotor shaft is in the specific-vibration-state in the specific-vibration-state determination step and it is determined that the motor is not in the excited state in the excited state in the excited state determination step, wherein the motor includes a stator disposed so as to surround the rotor shaft, the stator including a plurality of elemental stators disposed in series along the rotor shaft, and wherein the vibration suppression execution step includes applying the exciting voltage to a target elemental stator comprising at least one elemental stator of the plurality of elemental stators, the target elemental stator being determined for each of vibration modes of the rotor shaft.

5. The method of suppressing shaft vibration of a turbocharger according to claim 4, wherein the motor is mounted to an end portion of the turbocharger on a compressor side.

6. A method of suppressing shaft vibration of a turbocharger capable of being driven by a motor, the method comprising:

a specific-vibration-state determination step of determining whether a rotor shaft of the turbocharger is in a specific vibration state in which a magnitude of shaft vibration of the rotor shaft is, or is likely to be, greater than a predetermined magnitude;

an excited state determination step of determining whether the motor is in an excited state in which the exciting voltage is applied to the motor;

a vibration suppression execution step of applying the exciting voltage to the motor if it is determined that the rotor shaft is in the specific-vibration-state in the specific-vibration-state determination step and it is determined that the motor is not in the excited state in the excited state in the excited state determination step; and a vibration suppression execution prohibition step of prohibiting execution of the vibration suppression execution step, wherein the vibration suppression execution prohibition step includes:

an equipment temperature acquisition step of obtaining an equipment temperature of equipment including at least one of the motor or an inverter for driving the motor; and a prohibition execution step of prohibiting execution of the vibration suppression execution step if the equipment temperature is equal to or greater than a predetermined equipment temperature threshold.

7. The method of suppressing shaft vibration of a turbocharger according to claim 6, further comprising a notification step of notifying execution of the vibration suppression execution prohibition step.

8. A vibration suppression apparatus for a turbocharger, configured to suppress shaft vibration of a turbocharger capable of being driven by a motor, the vibration suppression apparatus comprising:
 a specific vibration state determination part configured to determine whether a rotor shaft of the turbocharger is in a specific vibration state in which a magnitude of shaft vibration of the rotor shaft is, or is likely to be, greater than a predetermined magnitude;
 an excited state determination part configured to determine whether the motor is in an excited state in which an exciting voltage is applied to the motor;
 a vibration-suppression execution part configured to apply the exciting voltage to the motor if it is determined that the rotor shaft is in the specific vibration state by the specific vibration state determination part and it is determined that the motor is not in the excited state by the excited state determination part;
 wherein the specific vibration state determination part includes:
  an actual turbo rotation speed acquisition part configured to obtain an actual turbo rotation speed of the rotor shaft and
  a critical speed range exceedance determination part configured to determine that the rotor shaft is in the specific vibration state in which the magnitude of the shaft vibration of the rotor shaft is likely to be greater than the predetermined magnitude, if the actual turbo rotation speed obtained by the actual turbo rotation speed acquisition part is within a critical speed range of the rotor shaft and
 wherein the vibration suppression apparatus for a turbocharger further comprises: a critical-speed-range correction part configured to correct an extent of the critical speed range,
 wherein the critical-speed-range correction part includes:
  a bearing-temperature acquisition part configured to obtain a bearing temperature of a bearing of the rotor shaft; and
  a correction execution part configured to correct the extent of the critical speed range on the basis of the bearing temperature obtained by the bearing-temperature acquisition part.

9. The vibration suppression apparatus for a turbocharger according to claim 8, wherein the specific vibration state determination part includes:
 a vibration detection value acquisition part configured to obtain a vibration detection value of the shaft vibration of the rotor shaft; and
 a vibration determination part configured to determine that the rotor shaft is in the specific vibration state in which the magnitude of the shaft vibration of the rotor shaft is greater than the predetermined magnitude, if the vibration detection value obtained by the vibration detection value acquisition part is greater than a predetermined vibration threshold.

10. The vibration suppression apparatus for a turbocharger according to claim 8, wherein the motor is mounted to an end portion of the turbocharger on a compressor side.

11. A turbocharger comprising:
 a rotor shaft;
 a motor capable of driving the turbocharger and of applying a rotational force to the rotor shaft with electric power;
 a turbine wheel driven by exhaust gas discharged from an engine;
 a compressor wheel coupled to the turbine wheel via the rotor shaft; and
 the vibration suppression apparatus for a turbocharger according to claim 8.

12. A vibration suppression apparatus for a turbocharger, configured to suppress shaft vibration of a turbocharger capable of being driven by a motor, the vibration suppression apparatus comprising:
 a specific vibration state determination part configured to determine whether a rotor shaft of the turbocharger is in a specific vibration state in which a magnitude of shaft vibration of the rotor shaft is, or is likely to be, greater than a predetermined magnitude;
 an excited state determination part configured to determine whether the motor is in an excited state in which an exciting voltage is applied to the motor; and
 a vibration-suppression execution part configured to apply the exciting voltage to the motor if it is determined that the rotor shaft is in the specific vibration state by the specific vibration state determination part and it is determined that the motor is not in the excited state by the excited state determination part,
 wherein the specific vibration state determination part includes:
  a bearing-temperature acquisition part configured to obtain a bearing temperature of a bearing of the rotor shaft; and
  a bearing temperature determination part configured to determine that the rotor shaft is in the specific vibration state in which the magnitude of the shaft vibration of the rotor shaft is likely to be greater than the predetermined magnitude, if the bearing temperature obtained by the bearing-temperature acquisition part is greater than a predetermined bearing temperature threshold.

13. A vibration suppression apparatus for a turbocharger, configured to suppress shaft vibration of a turbocharger capable of being driven by a motor, the vibration suppression apparatus comprising:
 a specific vibration state determination part configured to determine whether a rotor shaft of the turbocharger is in a specific vibration state in which a magnitude of shaft vibration of the rotor shaft is, or is likely to be, greater than a predetermined magnitude;
 an excited state determination part configured to determine whether the motor is in an excited state in which an exciting voltage is applied to the motor; and
 a vibration-suppression execution part configured to apply the exciting voltage to the motor if it is determined that the rotor shaft is in the specific vibration state by the specific vibration state determination part and it is determined that the motor is not in the excited state by the excited state determination part,
 wherein the motor includes a stator disposed so as to surround the rotor shaft, the stator including a plurality of elemental stators disposed in series along the rotor shaft, and
 wherein the vibration-suppression execution part is configured to apply the exciting voltage to a target elemental stator comprising at least one elemental stator of the plurality of elemental stators, the target elemental stator being determined for each of vibration modes of the rotor shaft.

14. The vibration suppression apparatus for a turbocharger according to claim 13, wherein the target elemental stator includes an elemental stator, disposed closest to the end portion of the turbocharger on the compressor side, of the plurality of elemental stators.

15. A vibration suppression apparatus for a turbocharger, configured to suppress shaft vibration of a turbocharger capable of being driven by a motor, the vibration suppression apparatus comprising:
- a specific vibration state determination part configured to determine whether a rotor shaft of the turbocharger is in a specific vibration state in which a magnitude of shaft vibration of the rotor shaft is, or is likely to be, greater than a predetermined magnitude;
- an excited state determination part configured to determine whether the motor is in an excited state in which an exciting voltage is applied to the motor; and
- a vibration-suppression execution part configured to apply the exciting voltage to the motor if it is determined that the rotor shaft is in the specific vibration state by the specific vibration state determination part and it is determined that the motor is not in the excited state by the excited state determination part, and
- a vibration-suppression execution prohibition part configured to prohibit execution of the vibration-suppression execution part, wherein the vibration-suppression execution prohibition part includes:
- an equipment temperature acquisition part configured to obtain an equipment temperature of equipment including at least one of the motor or an inverter for driving the motor; and
- a prohibition execution part configured to prohibit execution of the vibration- suppression execution part if the equipment temperature is equal to or greater than a predetermined equipment temperature threshold.

16. The vibration suppression apparatus for a turbocharger according to claim 15, further comprising a notification part configured to notify execution of the vibration-suppression execution prohibition part.

* * * * *